(12) United States Patent
Ise et al.

(10) Patent No.: US 9,086,880 B2
(45) Date of Patent: Jul. 21, 2015

(54) COMMUNICATION DEVICE MANAGEMENT APPARATUS, USER DEVICE, AND SERVICE DEVICE

(75) Inventors: Kotaro Ise, Kanagawa-ken (JP); Takeshi Ishihara, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 693 days.

(21) Appl. No.: 13/231,012

(22) Filed: Sep. 13, 2011

(65) Prior Publication Data
US 2012/0079296 A1    Mar. 29, 2012

(30) Foreign Application Priority Data

Sep. 29, 2010    (JP) .................................. 2010-219270

(51) Int. Cl.
*G06F 1/32* (2006.01)
(52) U.S. Cl.
CPC ........ *G06F 1/325* (2013.01); *Y02B 60/32* (2013.01)
(58) Field of Classification Search
None
See application file for complete search history.

(56) References Cited

U.S. PATENT DOCUMENTS

| | | | |
|---|---|---|---|
| 5,974,552 A * | 10/1999 | Lim et al. ..................... | 713/300 |
| 7,787,821 B2 | 8/2010 | Hamaguchi | |
| 8,099,612 B2 | 1/2012 | Tomita | |
| 2007/0265009 A1 | 11/2007 | Hamaguchi | |
| 2009/0135751 A1 * | 5/2009 | Hodges et al. ................ | 370/311 |
| 2009/0217063 A1 | 8/2009 | Tomita | |
| 2010/0169677 A1 * | 7/2010 | Madhusoodanan ........... | 713/310 |
| 2010/0250978 A1 * | 9/2010 | Nakamura ..................... | 713/300 |

FOREIGN PATENT DOCUMENTS

| | | |
|---|---|---|
| JP | 10-124191 | 5/1998 |
| JP | 2001-075687 | 3/2001 |
| JP | 2007-110332 | 4/2007 |
| JP | 2007-306201 | 11/2007 |
| JP | 2008-261867 | 10/2008 |
| JP | 2009-199283 | 9/2009 |

OTHER PUBLICATIONS

Japanese Office Action for Japanese Application No. 2010-219270 mailed on Sep. 11, 2012.

(Continued)

*Primary Examiner* — Paul Yanchus, III
(74) *Attorney, Agent, or Firm* — Amin, Turocy & Watson, LLP

(57) ABSTRACT

A communication device management apparatus includes a communication unit for communicating with a user device and a service device, a device information storing unit for storing device information of the service device that is received from the service device via the communication unit, an activation signal processing unit for receiving an activation signal from the user device via the communication unit, a device information transmission unit for transmitting the device information stored in the device information storing unit to the user device via the communication unit, and a power management unit for controlling an operational state. When the activation signal processing unit receives the activation signal, the power management unit shifts the operational state from an idle state to an active state consuming much power. The power management unit shifts the operational state from the active state to the idle state thereafter.

13 Claims, 19 Drawing Sheets

(56) References Cited

OTHER PUBLICATIONS

Office Action of Notification of Reason(s) for Refusal for Japanese Patent Application No. 2012-248537, Dated Oct. 1, 2013, 6 pgs.

IETF (Internet Engineering Task Force) RFC 2165 SLP (Service Location Protocol).

Office Action of Notification of Reason(s) for Refusal for Japanese Patent Application No. 2012-248536 Dated Dec. 17, 2013, 4 pgs.

* cited by examiner

FIG. 5

```
<serviceList>
<service>
<serviceType>
urn:schemas-upnp-org:service:ContentDirectory:3
</serviceType>
<serviceId>
urn:upnp-org:serviceId:ContentDirectory
</serviceId>
</service>
<service>
<serviceType>
urn:schemas-upnp-org:service:ConnectionManager:2
</serviceType>
<serviceId>
urn:upnp-org:serviceId:ConnectionManager
</serviceId>
</service>
</serviceList>
```

COMMUNICATION DEVICE MANAGEMENT APPARATUS, USER DEVICE, AND SERVICE DEVICE

CROSS-REFERENCE TO RELATED APPLICATION

This application is based upon and claims the benefit of priority from provisional US Patent Application 2010-219270 filed on Sep. 29, 2010, the entire contents of which are incorporated herein by reference.

FIELD

Embodiments of the present invention relates to a communication device management apparatus, a user device, and a service device.

BACKGROUND

As communication technology is widely spread, home electronic appliances such as air conditioners and television sets are going to be connected to a home network. Network Attached Storage (NAS) for home use is also available on the market, and the NAS is also connected to the home network. When the home network is used, for example, remote control such as using an air conditioning function (service) of an air conditioner (service device) can be realized using a PC (user device).

When the user device and the service device communicate with each other in the home network, the service device needs to be in power ON state, but this causes a problem in that a standby power consumption (power consumption while the user device does not use the service device) in the home increases.

In order to solve such problem, there is a technique called WOL (Wake On LAN). In this technique, the user device transmits a packet called a magic packet to the service device, and the service device can be turned on when the service device receives the magic packet. When this technique is used, after the user device turns on the service device, the user device can receive service from the service device. Therefore, the service device can turn off almost all the constituent elements except the network interface while the service is not provided. This reduces the power consumption in the standby time.

The magic packet has a particular bit pattern related to a MAC (Media Access Control) address of the device which is to be turned on. Therefore, in order for the user device to transmit the magic packet, the user device needs to obtain the MAC address of the service device in advance and set it to the user device.

For example, when many service devices are connected to the home network, the user has to set many MAC addresses of the service devices in the user device, and it is cumbersome to do so.

A method as defined in SLP (Service Location Protocol: IETF RFC 2165) is known, in which each service device connected to a network registers service attribute information of itself to a directory agent, and a user device searches the service attribute information from the directory agent (RFC 2165 Service Location Protocol, IETF, 1997).

According to this technique, the user device does not need to obtain the MAC address from each of the service devices, and the user device can obtain the MAC addresses from only the directory agent. Accordingly, the MAC addresses of the service devices can be automatically set to the user device, which makes it less cumbersome for the user to do so.

Here, however, it is necessary for the directory agent to be kept running at all times in order to communicate with the user device and each of the service devices, and this causes a problem in that new power consumption occurs.

An object of a communication device management apparatus according to an embodiment of the present invention is to allow a user device to easily set device information of a service device connected to a network and to reduce power consumption of a directory agent.

BRIEF DESCRIPTION OF THE DRAWINGS

FIG. 5 is a figure illustrating an example of a service identifier used in the directory agent of FIG. 2;

DETAILED DESCRIPTION

A communication device management apparatus according to an embodiment of the present invention includes a communication unit configured to communicate with a user device and a service device, a device information storing unit configured to store device information of the service device that is received from the service device via the communication unit, an activation signal processing unit configured to receive an activation signal from the user device via the communication unit, a device information transmission unit configured to transmit the device information stored in the device information storing unit to the user device via the communication unit, and a power management unit configured to control an operational state, wherein when the activation signal processing unit receives the activation signal, the power management unit shifts the operational state from a idle state to an active state consuming much power, after the operational mode is shifted to the active state, the device information transmission unit transmits the device information, and after the device information is transmitted, the power management unit shifts the operational state from the active state to the idle state.

An embodiment of the present invention will be hereinafter explained with reference to drawings.

First Embodiment

Figure 1:
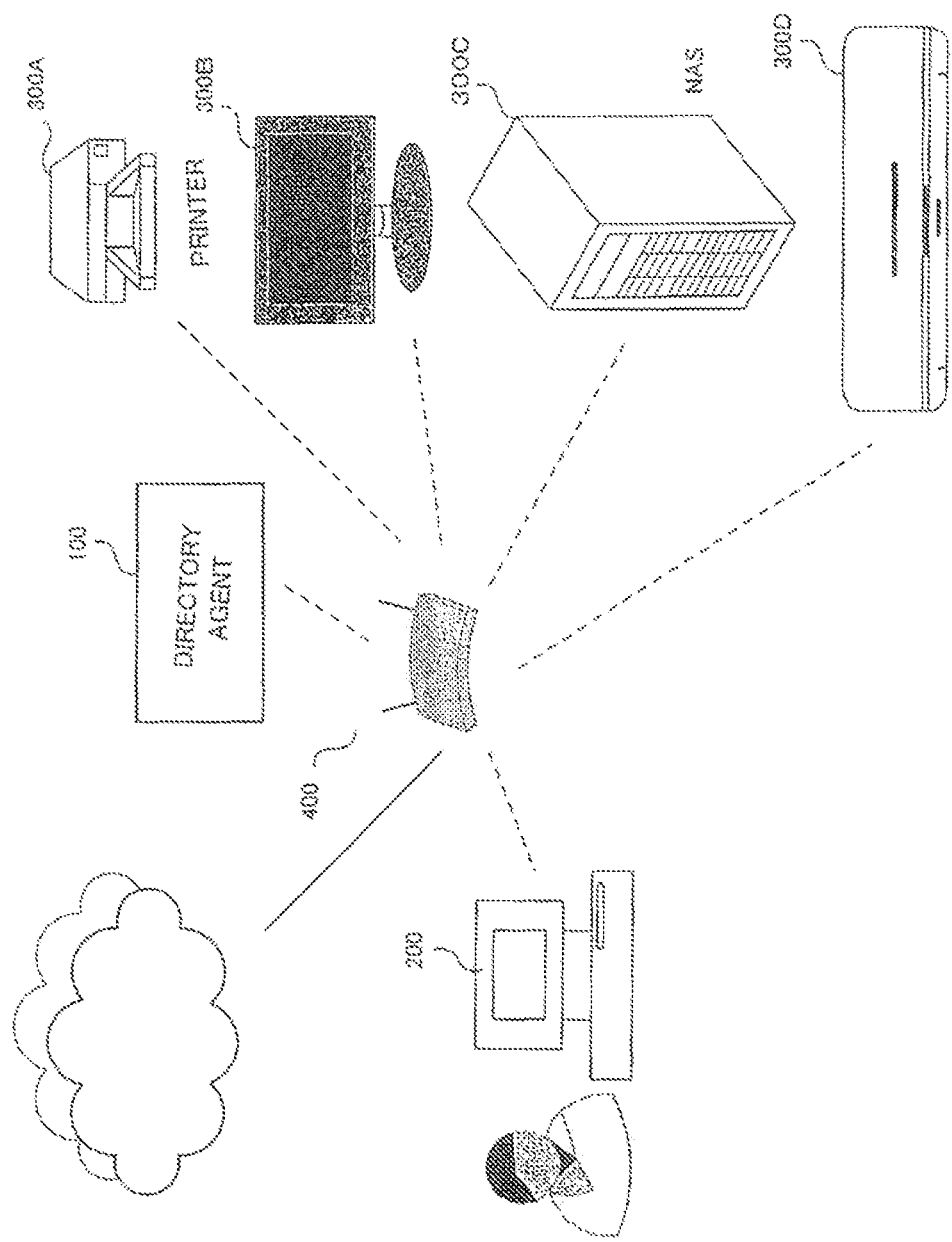
FIG. 1 is a block diagram illustrating a configuration of a system according to a first embodiment of the present invention.

FIG. 1 is a block diagram illustrating a configuration of a system according to the first embodiment of the present invention. The system as shown in FIG. 1 includes a directory agent 100, a user device 200, and service devices 300A, 300B, 300C, 300D. The directory agent 100, the user device 200, and the service devices 300A, 300B, 300C, 300D are connected with each other via a wireless LAN access point 400, thus forming a home network. More specifically, each device communicates using IP protocol over IEEE802.11 wireless LAN. Further, the home network is also connected to another network via the wireless LAN access point 400. Here, the directory agent 100 is a communication device management apparatus for managing device information of the service devices 300A, 300B, 300C, 300D.

In FIG. 1, for example, the user device 200 is a PC, and each of the service devices 300A, 300B, 300C, 300D is shown as a printer, a television set, a NAS, an air conditioner, respectively.

In the present embodiment, each of the directory agent 100, the user device 200, and the service devices 300A, 300B, 300C, 300D shifts its operational state. Here, for example, the operational states include G0 (operating state), G1 (sleeping (so-called sleep or hibernation) state, in which the operational state can be shifted to G0 in a shorter time than from the state of G2), G2 (soft off (so-called power OFF state in which the power consumption is less than that of G1 but it takes a longer time for the operational state to shift to G0 than from G1)), and G3 (mechanically, completely turned off). The details of the operational states G0, G1, G2, G3 herein are defined in a specification of personal computer power management, i.e., Advanced Configuration and Power Interface Specification. In the present embodiment, the operational state shifts between two states, i.e., G0 and G2, among the operational states G0, G1, G2, G3. Then, in the explanation below, G0 is referred to as an active state (or power ON state), and G2 is referred to as an idle state (or power OFF state). In the present embodiment, G2 is a state in which the power consumption is less than that in the active state. But in G2, it is possible to receive an activation signal (magic packet), and when the activation signal is received, the state of the device can be shifted from G2 to G0. Further, G0 is a state in which the apparatus can perform processing relating to a function originally provided in the device.

Here, each of the service devices 300A, 300B, 300C, 300D is a device for providing service to the user device 200. The service devices 300A to 300D are usually at power OFF state, and are turned on as necessary so as to provide services. When the user device 200 wishes to receive service provided by any one of the service devices 300A, 300B, 300C, 300D, for example, the user device 200 turns on any one of the service devices 300A, 300B, 300C, 300D. It should be noted that when the user device 200 performs processing for turning on any one of the service devices 300A, 300B, 300C, 300D, it is not necessary for a user to directly perform operation. For example, the user device 200 may be automatically activated by a timer, and thereafter, the user device 200 may make a setting for activating the service devices 300A to 300D. The user device 200 transmits an activation signal in order to activate the service devices 300A to 300D. For example, the activation signal is a magic packet. However, as long as another device can be activated by sending a signal to the device, any signal can be used as the activation signal.

Figure 2:
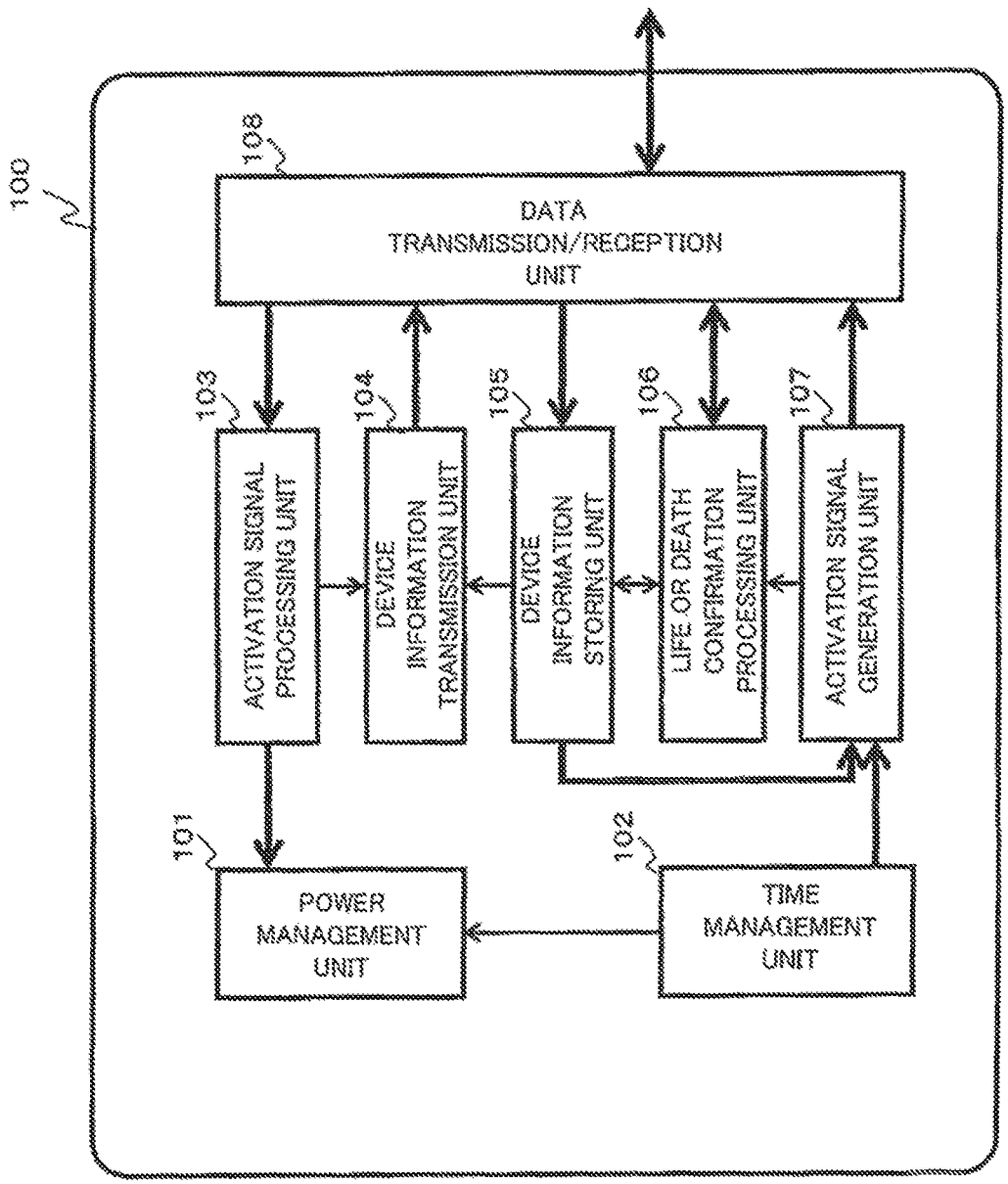
FIG. 2 is a block diagram illustrating an example of configuration of a directory agent as shown in FIG. 1.

FIG. 2 is a block diagram illustrating an example of configuration of a directory agent 100 as shown in FIG. 1.

A data transmission/reception unit 108 communicates with the user device 200 and the service devices 300A to 300D.

An activation signal processing unit 103 receives an activation signal via the data transmission/reception unit 108 from the service devices 300A to 300D and the user device 200.

The activation signal generation unit 107 generates an activation signal to be transmitted to the service devices 300A to 300D.

Figure 3:
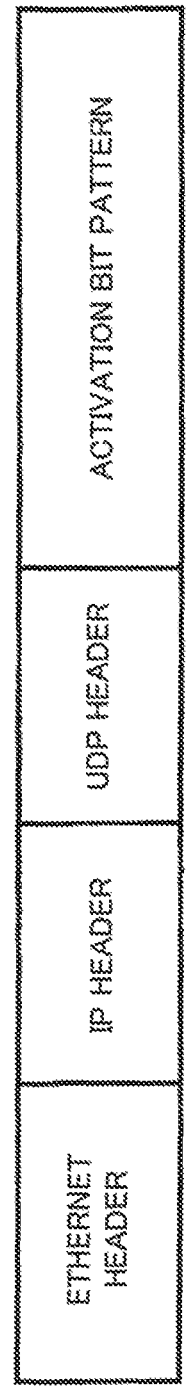
FIG. 3 is a figure illustrating an example of format of an activation signal used in the directory agent as shown in FIG. 2.

Here, using FIG. 3, an example of a format of the activation signal is shown. The activation signal is made by encapsulating a UDP datagram in an IP packet, which is then encapsulated in an Ethernet frame. A destination address of an IP header is, for example, a multicast address such as 224.1.1.1 or a broadcast address such as 133.111.111.255. A source address of the IP header is a source address of the device which transmits the activation signal. However, when no IP address is set in the device which transmits the activation signal, the source address of the IP header is set as 0.0.0.0. A destination address of an Ethernet header is set as a multicast address, a broadcast address, or a MAC address of the destination device. An activation bit pattern is generated from the MAC address of the device to be activated. For example, the activation bit pattern includes FFFFFFFFFFFF (hexadecimal form) at the beginning and subsequently includes 16 repetitions of the MAC address of the device to be activated.

A power management unit 101 controls the operational state of the directory agent 100 for its own.

Device information storing unit 105 stores the device information received via the data transmission/reception unit 108 from the service devices 300A to 300D. Here, the device information of the service devices 300A to 300D preferably includes the type of service, the type of service protocol, the operational state, nickname, and the MAC address of the device. When the service devices 300A to 300D are a printer, a NAS, an air conditioner, and a television set, the type of service thereof are the printer, the NAS, the air conditioner, and the television set, respectively. The types of service protocols are used by the service devices 300A to 300D to provide services. Examples of types of service protocols include SMB, NETBIOS, UpnP, DLNA, and ECHONET. Further, the nickname is allocated to each of the service devices 300A to 300D. For example, where there are two printers as service devices, they are distinguished from each other by giving nicknames "Pudding" and "Melon" to these printers. Further, the IP address of the device may be added to the device information. Therefore, the user device can obtain the IP address of the service device as the device information, and accordingly, the user device can omit IP address discovery procedure for discovering the service device when the user device uses service. However, when no IP address is assigned to the service device, absence of IP address may be represented by using 0.0.0.0. When an IP address is assigned by DHCP (Dynamic Host Configuration Protocol) and the like, 0.0.0.0 may be used as the device information even if the IP address is assigned to the service device because of the reason that a lease time of the DHCP is short.

The device information transmission unit 104 transmits the device information via the data transmission/reception unit 107.

Figure 4:
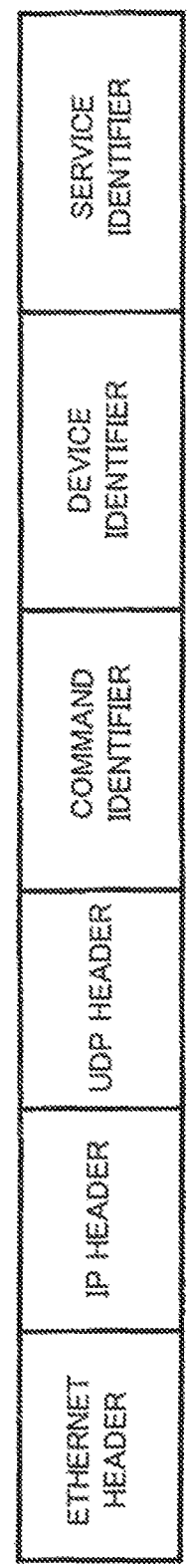
FIG. 4 is a figure illustrating an example of format of a life signal used in the directory agent as shown in FIG. 2.

A life confirmation processing unit 106 transmits a life confirmation request via the data transmission/reception unit 108 to the service devices 300A to 300D, and receives a life notification to confirm life of the service devices 300A to 300D. Here, the life confirmation is a processing for confirming whether the service devices 300A to 300D are validly connected to the network (in this example, home network) connected to the directory agent 100. Here, examples of formats of the life confirmation request and a notification thereof will be shown in FIG. 4. The life confirmation request and the life notification are conveyed by a UDP datagram, and encapsulated in an IP packet and in an Ethernet frame. A command identifier for a life confirmation request is defined as "life confirmation request". A command identifier for life notification is "life notification". A device identifier is information for uniquely identifying a device such as a MAC address, a UUID (Universally Unique Identifier), and an FQDN (Fully Qualified Domain Name). Further, a service identifier is, for example, information for uniquely identifying a service such as a UUID and an FQDN. The life confirmation request or the life notification may include a plurality of device identifiers and a plurality of service identifiers. In particular, when one device includes a plurality of services, the plurality of service identifiers is desirably included in the life confirmation or the life notification. When a plurality of virtual devices is made of one physical device, the plurality of device identifiers is preferably included in the life confirmation or the life notification.

FIG. 5 illustrates an example of a service identifier. In the example of FIG. 5, the service identifier includes two pieces of service information, i.e., Contentdirectory and Connectionmanager.

A time management unit 102 repeatedly transmits events to a power management unit 101 and an activation signal generation unit 107 with a time interval defined in advance.

Figure 6:
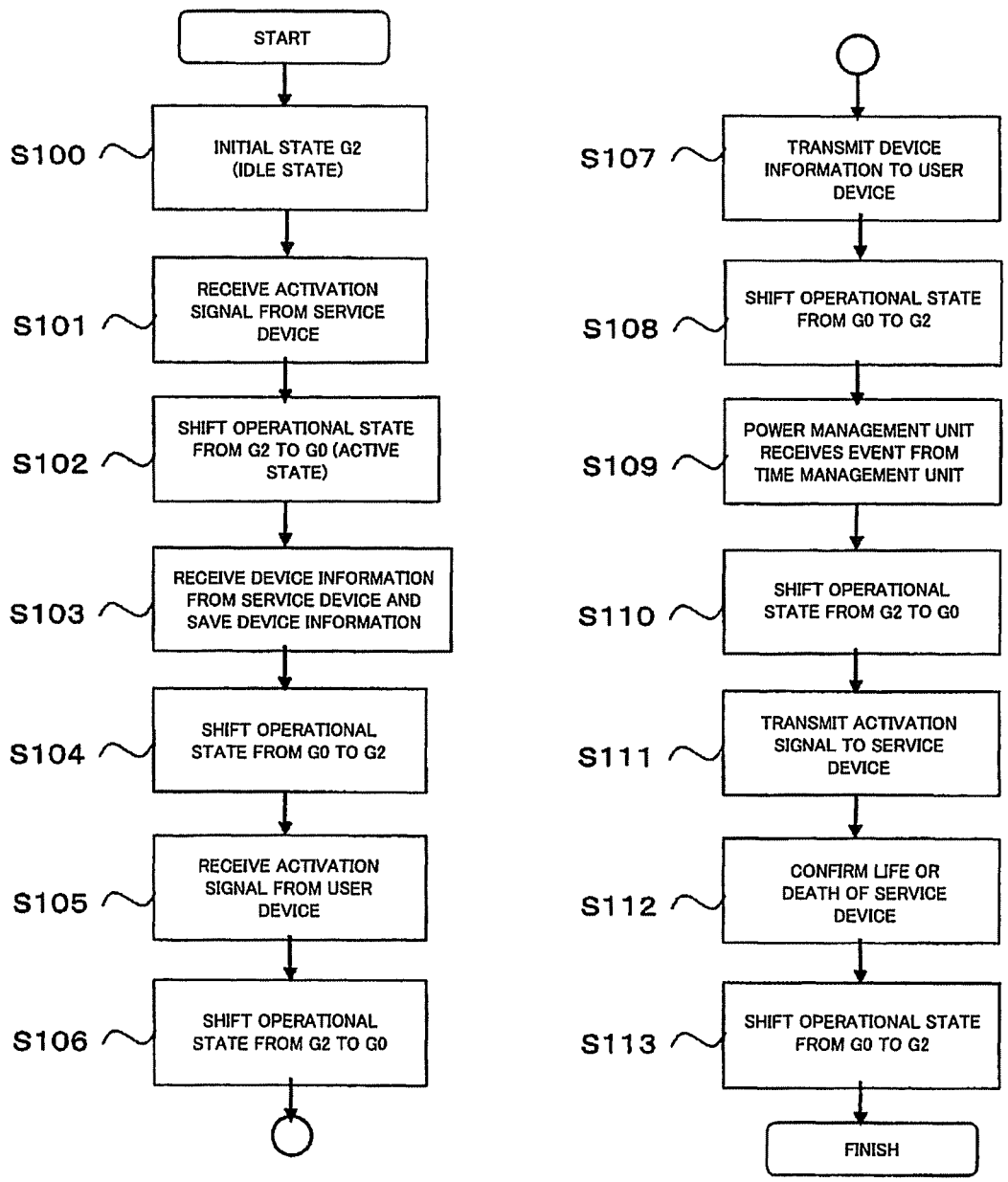
FIG. 6 is a flowchart illustrating operation of the directory agent as shown in FIG. 2.

Then, operation of the directory agent 100 will be explained. FIG. 6 is a flowchart illustrating operation of the directory agent 100 according to the first embodiment of the present invention. In the explanation about operation below, any one of the service devices 300A to 300D is referred to as a service device 300.

In the explanation below, the initial state of the operational state of the directory agent 100 is assumed to be G2 (idle state) (S100).

First, the activation signal processing unit 103 receives an activation signal via the data transmission/reception unit 108 from the service device 300 (S101). When the activation signal processing unit 103 receives an activation signal, the activation signal processing unit 103 transmits an event to the power management unit 101. Here, the activation signal preferably includes identification information for indicating whether it is transmitted from the service device 300 or the user device 200.

When the power management unit 101 receives the event, the operational state of the directory agent 100 is shifted from G2 (idle state) to G0 (active state) (S102).

The device information storing unit 105 stores the device information (S103) when the device information storing unit 105 receives the device information via the data transmission/reception unit 108 from the service device 300. When the device information storing unit 105 completes storing the device information provided by the service device 300, the power management unit 101 shifts the operational state to G2 (idle state) (S104). At this occasion, the power management unit 101 preferably shifts the operational state to G2 (idle state) after the power management unit 101 confirms that the device information storing unit 105 completes storing the device information or after a predetermined period of time passes.

When the activation signal processing unit 103 receives the activation signal via the data transmission/reception unit 108 from the user device 200 (S105), an event is transmitted to the power management unit 101 and the device information transmission unit 104. The power management unit 101 receiving the event shifts the operational state to G0 (active state) (S106). The device information transmission unit 104 receiving the event transmits the device information stored in the device information storing unit 105 to the user device 200 that transmitted the activation signal (S107). For example, the device information transmitted at this moment is all the information stored in the device information storing unit 105. Regarding the transmitted device information, only the device information of a service device 300 needed by the user device 200 may be transmitted. Information about what device information of the service device 300 is needed by the user device 200 is transmitted from the user device 200 to the directory agent 100 after the activation signal is received from the user device 200. More specifically, the user device 200 transmits information for narrowing down needed device information of the service device 300 (the type of service of the device information, the type of service protocol, the MAC address of the device) to the directory agent 100 as device information request. The directory agent 100 transmits a device information response carrying the device information of the specified service device to the user device 200. When the device information transmission unit 104 completes transmission of the device information to the user device 200, the power management unit 101 shifts the operational state to G2 (idle state) (S108).

The time management unit 102 repeatedly transmits events to the power management unit 101 and the activation signal generation unit 107 with a time interval defined in advance. When the power management unit 101 receives an event from the time management unit 102 (S109), the power management unit 101 shifts the operational state to G0 (active state) (S110). When the activation signal generation unit 107 receives an event from the time management unit 102, the activation signal generation unit 107 transmits an activation signal via the data transmission/reception unit 108 to all the service devices 300 stored in the device information storing unit 105 (S111). At this occasion, the activation signal may be transmitted to each service device 300, or may be transmitted to all the service devices 300 using multicast or broadcast. Thereafter, the activation signal generation unit 107 transmits an event to the life confirmation processing unit 106. When the life confirmation processing unit 106 receives the event, the life confirmation processing unit 106 transmits a life confirmation request to all the service devices 300 stored in the device information storing unit 105 via the data transmission/reception unit 108 (S112). At this occasion, the life confirmation request may be transmitted to each service device 300, or may be transmitted to all the service devices 300 using multicast or broadcast. The life confirmation processing unit 106 determines whether the corresponding device is available or not by receiving the life notification from the service device 300. If the life confirmation processing unit 106 detects a service device 300 from which a predetermined number of life notifications are not received, the life confirmation processing unit 106 deletes the device information of the corresponding device from the device information storing unit 105. When the life confirmation processing unit 106 completes the life confirmation, the power management unit 101 shifts the operational state to G2 (idle state) (S113).

Figure 7:
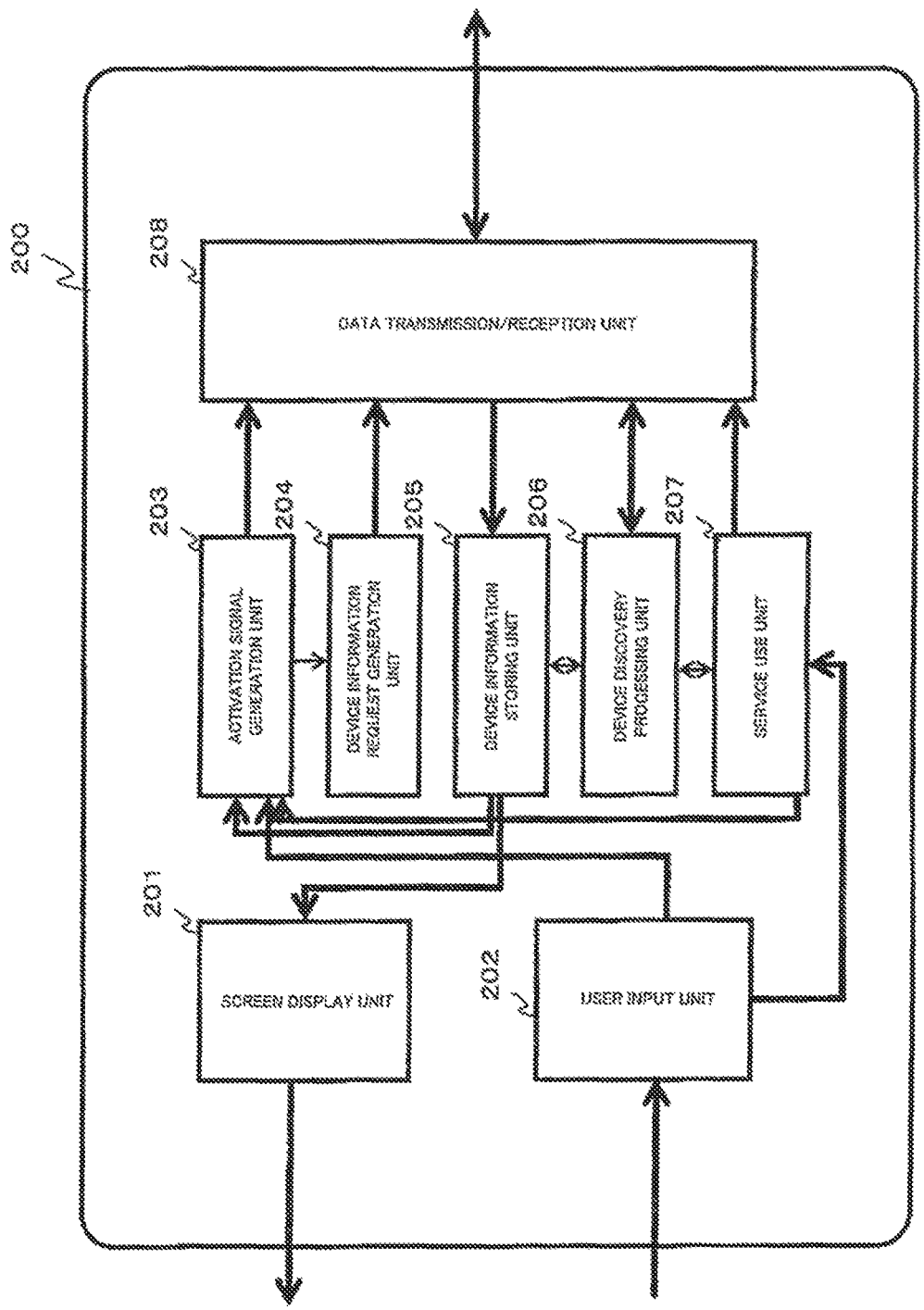
FIG. 7 is a block diagram illustrating an example of configuration of the user device as shown in FIG. 1.

FIG. 7 is a block diagram illustrating an example of configuration of the user device 200 as shown in FIG. 1.

The data transmission/reception unit 208 communicates with the directory agent 100 and the service devices 300A to 300D.

The activation signal generation unit 203 generates an activation signal, and transmits an activation signal via the data transmission/reception unit 208 to the service devices 300A to 300D or the directory agent 100.

The device information request generation unit 204 generates device information request to request the directory agent 100 to transmit the device information of the service device 300, and transmits the generated device information request via the data transmission/reception unit 208. The device information request may be transmitted using either broadcast or multicast, and may be transmitted to the directory agent 100 by unicast.

The device information storing unit 205 stores the device information received from the service devices 300A to 300D via the data transmission/reception unit 208.

Figure 8:
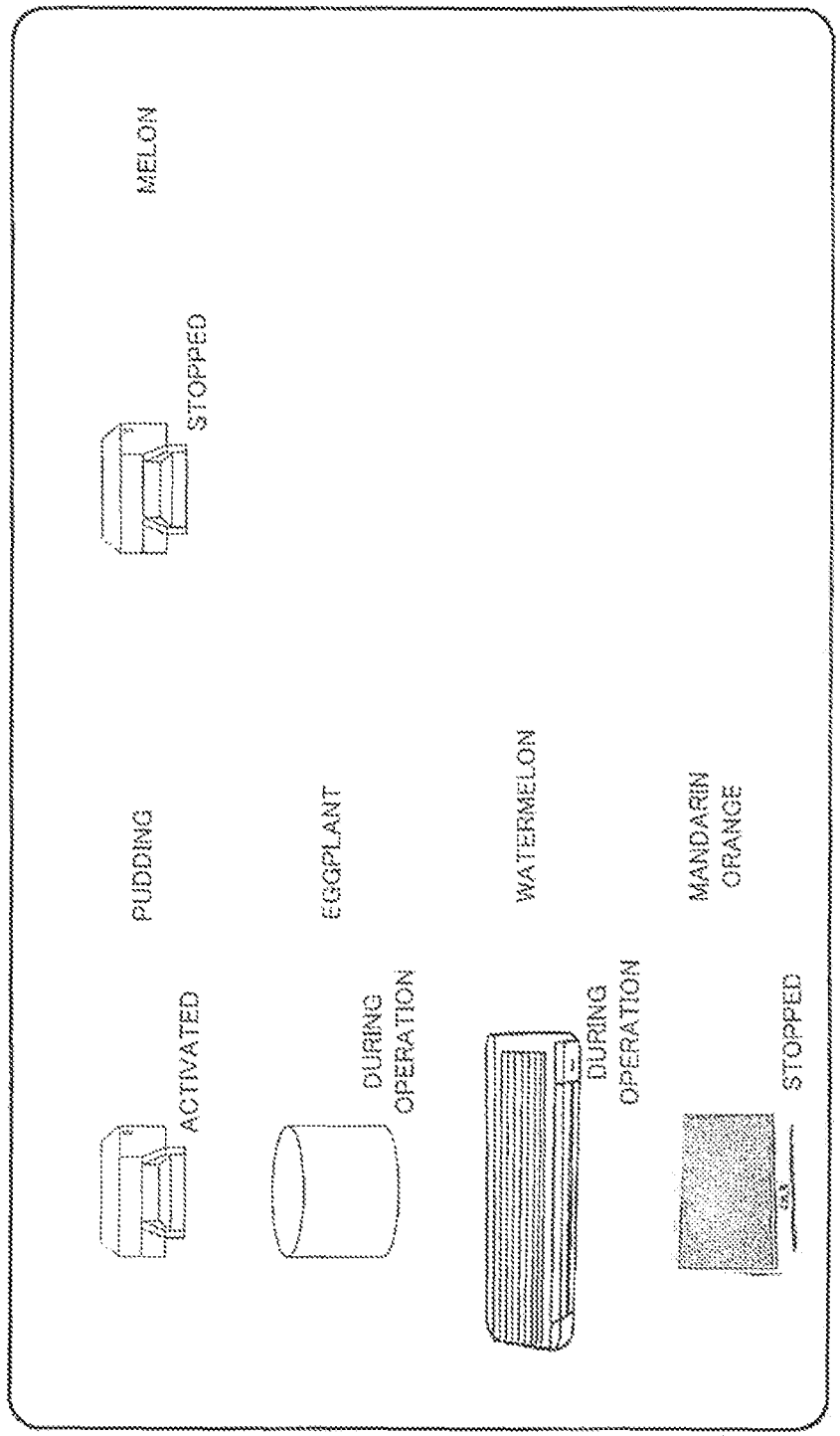
FIG. 8 is a figure illustrating an example of a screen of the user device as show in FIG. 7.

A screen display unit 201 displays the device information stored in the device information storing unit 205. FIG. 8 shows an example of display. In FIG. 8, icons represent the services provided by the service devices. Further, the operational state of the device is displayed at the lower right of the icon, and the nickname set for the service device is displayed at the right of the icon. (In FIG. 8, five service devices are displayed. That is, (printer, activated, Pudding), (printer, stopped, Melon), (NAS, during operation, Eggplant), (air conditioner, during operation, Watermelon), (a television set, stopped, Mandarin orange) are displayed in the format of (service, operational state, nickname).) Here, FIG. 8 displays the operational state in text. Instead of text, the operational state may be displayed with other kinds of means. For example, the icon may be grayed-out.

Here, when the user device 200 uses a service and needs to shift the operational states of a plurality of service devices, the services may not be separately displayed when the services are displayed on a user screen as shown in FIG. 8. In such case, the services may be displayed as one service, and when the user selects this, the operational states of all the service devices relating to this selection are shifted desirably. For example, when the icon of the printer (Pudding) is selected, it is desirable for the user device to also transmit the activation signal to the printer (Pudding) serving as a service device and a print server connected thereto (not shown).

An event of power-ON and an event of a service wished to be used by the user are input to a user input unit 202 by the user.

A device discovery processing unit 206 executes a protocol of device discovery/service discovery unique to a service such as UPnP and NETBIOS via the data transmission/reception unit 208. Information about the IP address of the device, the type of service, and the access method, which are discovered as a result of execution of the protocol, is notified to a service use unit 207.

The service use unit 207 uses a service of a service device via the data transmission/reception unit 208.

Figure 9:
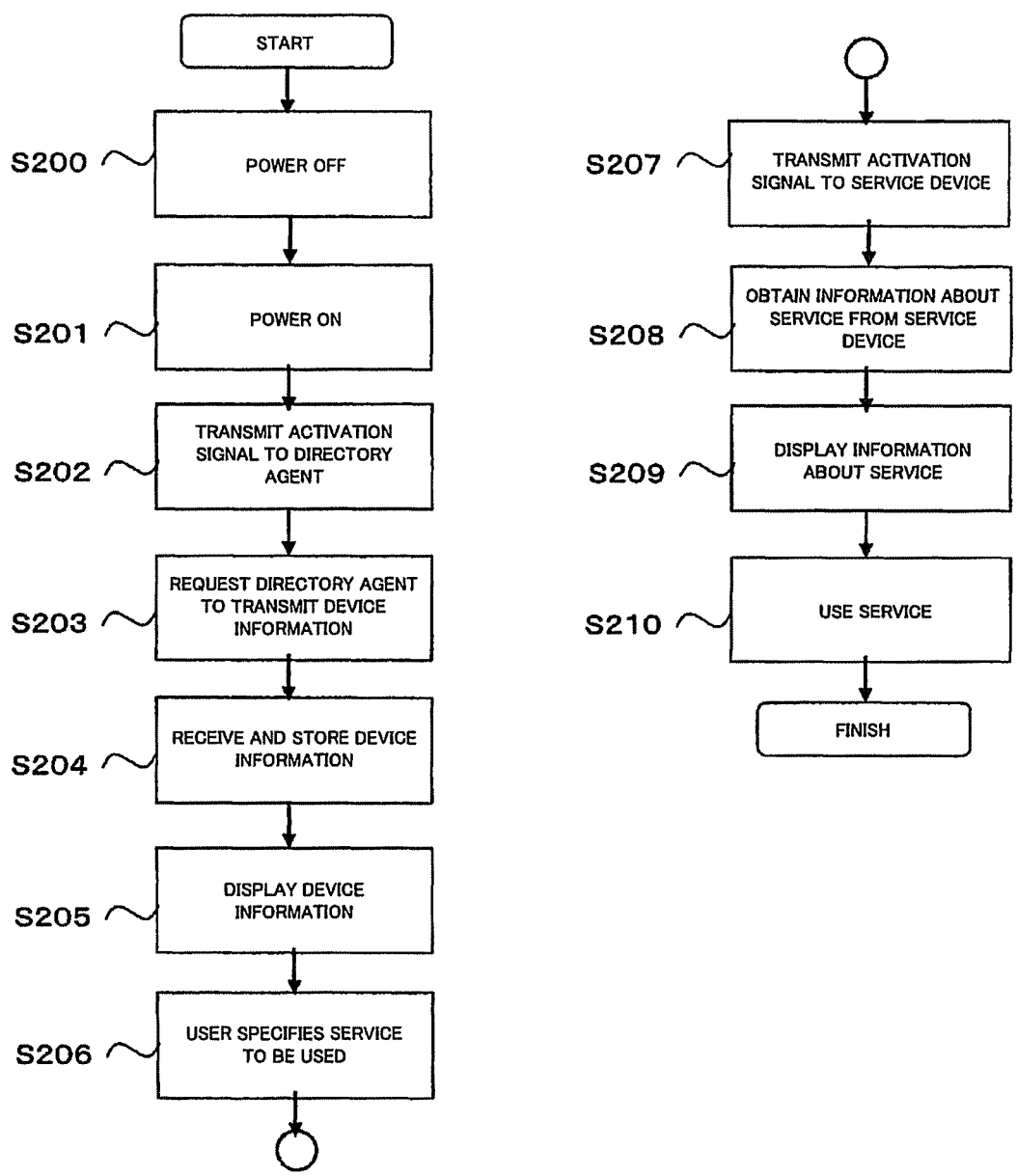
FIG. 9 is a flowchart illustrating operation of the user device as shown in FIG. 7.

Now, operation of the user device 200 will be explained. FIG. 9 is a flowchart illustrating operation of the user device 200 according to the first embodiment of the present invention.

In the explanation below, the initial state of the operational state of the user device 200 is assumed to be in power OFF state (S200).

For example, when an event of power-ON is sent from the user input unit 202 (S201), this event is transmitted to the activation signal generation unit 203, and the activation signal generation unit 203 transmits a magic packet via the data transmission/reception unit 208 (S202). A bit pattern generated from the MAC address of the directory agent 100 (this MAC address is set in the activation signal generation unit in advance) is preferably written to the magic packet, so that no other device except the directory agent 100 is activated.

When the magic packet is transmitted, the activation signal generation unit 203 notifies the event to the device information request generation unit 204, and the device information request generation unit 204 having received the event transmits a device information request via the data transmission/reception unit 208 to the directory agent 100 (203). The device information storing unit 205 receives the device information from the directory agent 100 via the data transmission/reception unit 208, and stores the received device information (S204).

The device information storing unit 205 having received the device information causes the screen display unit 201 to display the device information stored therein (S205). Further, the device information storing unit 205 transmits the device information to the device discovery processing unit 206.

When the service use unit 207 receives a service use event (for example, in a case where a user clicks an icon of a service which the user wants to use) via the user input unit 202 (S206), the service use event is stored to the device information storing unit 205, and the device information relating to the selected service is transmitted to the activation signal generation unit 204. Having received the device information, the activation signal generation unit 204 transmits a magic packet to the selected service device via the data transmission/reception unit 208 (S207).

Further, the service use unit 207 transmits the device information relating to the service selected with the user input unit 202 to the device discovery processing unit 206. The device discovery processing unit 206 uses the data transmission/reception unit 208 to execute a protocol of device discovery/service discovery unique to a service, such as UPnP and NETBIOS, on each pieces of the received device information (S208). Information about the IP address of the device, the type of service, and the access method, which are discovered as a result of execution of the protocol, is notified to the service use unit 207. Further, the device discovery processing unit 206 transmits the information about the service or the discovered device to the device information storing unit 205, which is then transmitted to the screen display unit 201 to be displayed (S209).

When the service use unit 207 receives such information as the IP address of the device, the type of service, and the access method for using the service from the device discovery processing unit 205, the service use unit 207 uses the service with the protocol for using the service such as SMB, DLNA, UPnP, NETBIOS, and ECHONET (S210).

In the present embodiment, the activation signal is transmitted to only the service device relating to the service specified by the user. Alternatively, the activation signal may be transmitted to many devices including the service device relating to the service specified by the user. For example, when the user specifies a DLNA device, an activation signal may be transmitted to all the DLNA devices. Alternatively, when a user specifies a certain service device (for example, a DMR (Digital Media Render: image rendering service) such as a television set), the activation signal may also be transmitted to a device related thereto such as a DMS (Digital Media Server: Content Accumulation Service) at a time. In general, this kind of operation can be achieved by preparing a table showing relationship between a device or a service specified by a user and a device activated together with the device or the service. In order to achieve this operation, for example, it is necessary to have a table showing relationship between the device specified by the user and a device transmitting an activation signal. This table may be set in the user device 200 in advance, or the user device 200 may receive the table from the directory agent 100 or another device.

Figure 10:
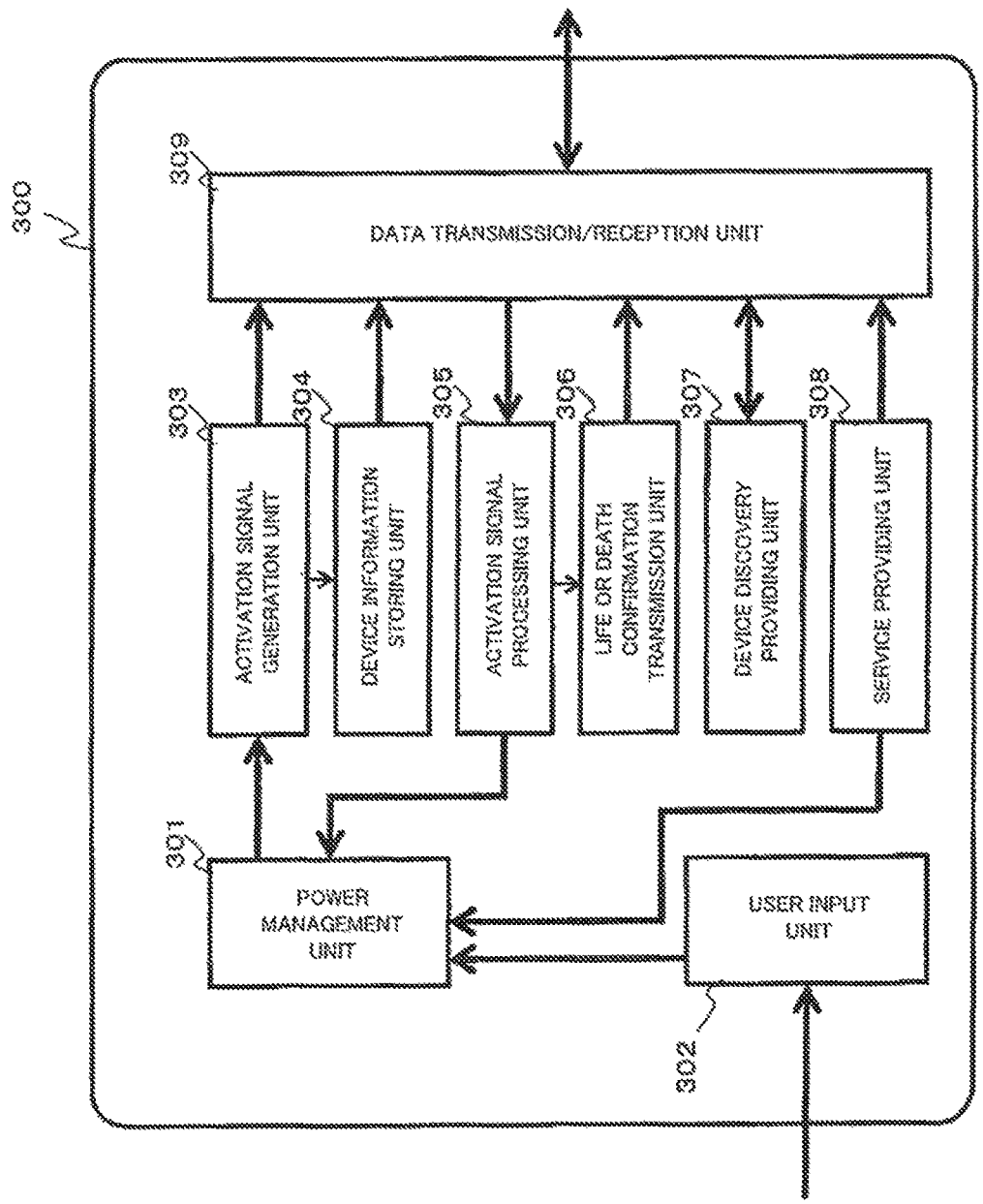
FIG. 10 is a block diagram illustrating an example of configuration of the service device as shown in FIG. 1.

FIG. 10 is a block diagram illustrating an example of configuration of the service device 300 as shown in FIG. 1. It should be noted that the configuration of each of the service devices 300A to 300D as shown in FIG. 1 is the same as the configuration of the service device 300. As described above, the service devices 300A to 300D are, for example, a printer, a television set, a NAS, and an air conditioner.

The data transmission/reception unit 309 communicates with the directory agent 100 and the user device 200.

When the user performs operation for turning on the device, the user input unit 302 transmits an event to the power management unit 301.

The power management unit 301 manages the operational state of the device of its own. For example, when an even of power-ON is received from the user input unit 302, the power management unit 301 shifts the operational state of the device itself from G2 (idle state) to G0 (active state).

The activation signal generation unit 303 generates an activation signal, and transmits the generated activation signal via the data transmission/reception unit 309 to the directory agent 100.

The device information storing unit 304 stores the device information of the device itself, and after the activation signal generation unit 303 transmits an activation signal, the device information storing unit 304 transmits the device information via the data transmission/reception unit 309 to the directory agent 100.

The activation signal processing unit 305 receives the activation signal from the user device 200 or the directory agent 100 via the data transmission/reception unit 309.

After the activation signal processing unit 305 receives the activation signal from the directory agent 100, a life confirmation transmission unit 306 transmits a life notification via the data transmission/reception unit 309 to the directory agent 100. At this occasion, the life confirmation transmission unit 306 may transmit a life notification after it receives the activation signal from the directory agent 100 as well as the life confirmation request, or may transmit a life notification automatically.

A device discovery providing unit 307 communicates with the device discovery processing unit 307 of the user device 200. This is executed according to a discovery protocol for a service or a device unique to a service such as UPnP, NETBIOS, and ECHONET.

A service providing unit 308 communicates with the service use unit 207 of the user device 200 via the data transmission/reception unit 309, and provides a service to the user device 200. This is executed according to a protocol unique to a service such as SMB, UPnP, DLNA, NETBIOS, and ECHONET.

Figure 11:
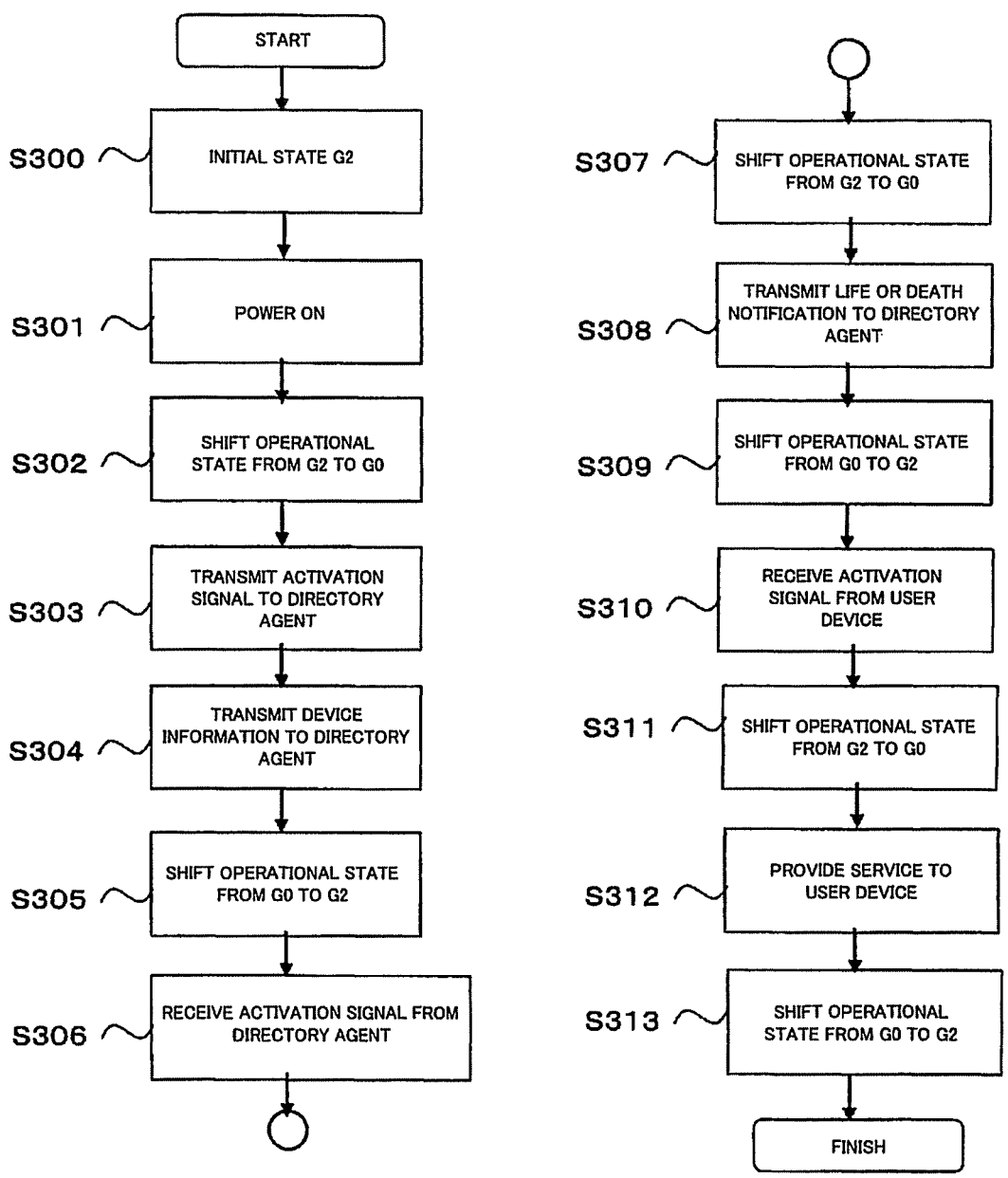
FIG. 11 is a flowchart illustrating operation of the service device as shown in FIG. 10.

Here, operation of the service device 300 according to the first embodiment of the present invention will be explained. FIG. 11 is a flowchart illustrating operation of the service device 300 according to the first embodiment of the present invention.

In the explanation below, the initial state of the operational state of the service device 300 is assumed to be G2 (idle state) (S300).

When predetermined operation, e.g., power-ON operation, is given from the outside with the user input unit 302 (S301), this event is transmitted to the power management unit 301 (S301).

When the power management unit 301 receives the event from the user input unit 302, the power management unit 301 shifts the operational state to G0 (active state) (S302), and transmits the event to the activation signal generation unit 303.

When the activation signal generation unit 303 receives the event from the power management unit 301, the activation signal generation unit 303 generates an activation signal using the MAC address of the directory agent 100 set in advance, and transmits the activation signal via the data transmission/reception unit 309 to the directory agent 100 (S303). Further, the event is transmitted to the device information storing unit 304.

When the device information storing unit 304 receives the event from the activation signal generation unit 303, the device information storing unit 304 transmits the device information stored in advance via the data transmission/reception unit 309 to the directory agent 100 (S304). At this occasion, the destination address to which the device information is conveyed may be a broadcast address, a multicast address set in advance, or the address of the directory agent 100 set in advance or obtained with a certain protocol. When the destination address is the address of the directory agent 100, for example, an IP address is set in advance, and the device information is transmitted to the IP address.

At this transmission, it is preferable for the device information storing unit 304 to wait for transmission of the device information for a certain period of time set in advance, since it takes a time to activate the directory agent 100. Alternatively, it is preferable for the device information storing unit 304 to transmit the device information after the device information storing unit 304 receives a message indicating that the directory agent 100 is ready to receive information from the directory agent 100.

After the power management unit 301 transmits the device information, the power management unit 301 shifts the operational state from G0 (active state) to G2 (idle state) (S305). At this occasion, it is preferable for the power management unit 301 to confirm completion of transmission of the device information or shift the operational state to G2 (idle state) after a certain period of time set in advance passes since the event is transmitted to the activation signal generation unit 303.

When the activation signal processing unit 303 receives the activation signal via the data transmission/reception unit 309 from the directory agent 100 (S306), the activation signal processing unit 303 transmits the event to the power management unit 301. When the activation signal is received from the directory agent 100, the event is also transmitted to the life confirmation transmission unit 306. When the power management unit 301 receives the event from the activation signal processing unit 305, the power management unit 301 shifts the operational state to G0 (active state) (S307). It is preferable to determine whether the activation signal is transmitted from the directory agent 100 or not by comparing the Ethernet source address or the IP source address of the activation signal with the address of the directory agent 100 set in advance. Alternatively, the activation signal may include identification information for identifying whether the activation signal is transmitted from the directory agent 100 or not, and the determination may be made on the basis of this information.

Receives the event from the activation signal processing unit 305, the life confirmation transmission unit 306 transmits a life notification via the data transmission/reception unit 309 to the directory agent 100 (S308). At this occasion, the life confirmation transmission unit 306 may transmit the life notification after it receives a life confirmation request from the directory agent 100. After the life confirmation transmission unit 306 transmits the life notification, the power management unit 301 shifts the operational state to G2 (idle state) (S309). The operational state is preferably shifted after the power management unit 301 confirms transmission of the life notification.

Receiving the activation signal via the data transmission/reception unit 309 from the user device 200 (S310), the activation signal processing unit 305 transmits an event to the power management unit 301. Receiving the event, the power management unit 301 shifts the operational state to G0 (active state) (S311).

The device discovery providing unit 307 communicates with the device discovery processing unit 206 of the user device 200. This is executed according to a discovery protocol for a service or a device unique to a service such as UPnP, NETBIOS, and ECHONET.

The service providing unit 308 communicates with the service use unit 207 of the user device 200, and provides the service to the user device 200 (S312). This is executed according to a protocol unique to a service such as SMB, UPnP, DLNA, NETBIOS, and ECHONET. When the service providing unit 308 does not provide the service for a predetermined period of time or more (more specifically, for example, in a case of DLNA, when the service providing unit 308 does not provide the content-providing processing for a predetermined period of time or more) after the operational state is shifted to G0 (active state), the service providing unit 308 transmits an event to the power management unit 301. Receives the event, the power management unit 301 shifts the operational state to G2 (idle state) (S313).

Figure 12:
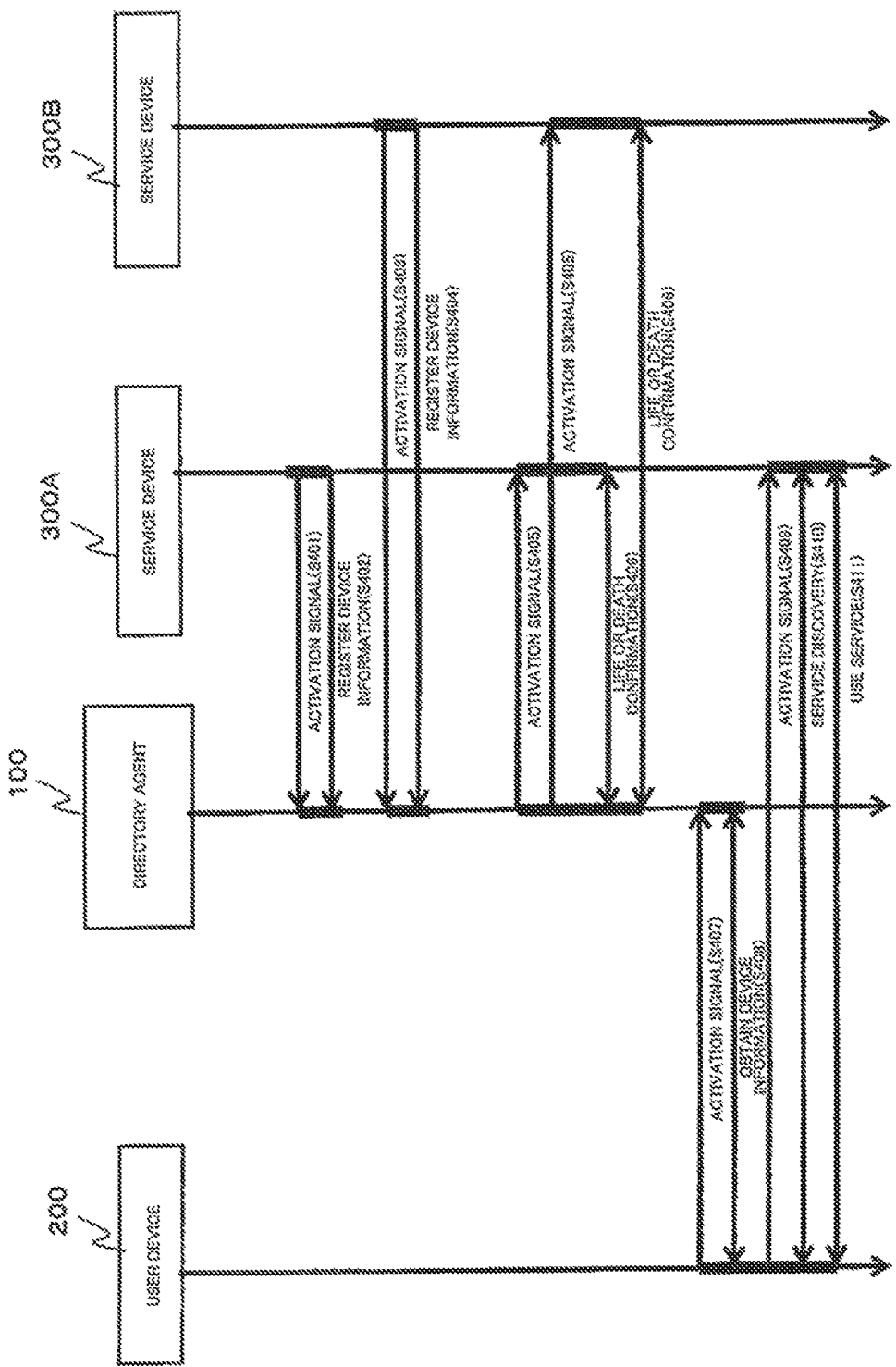
FIG. 12 is a sequence diagram illustrating operation performed among the user device, the service devices, and the directory agent in the system as shown in FIG. 1.

FIG. 12 is a sequence diagram illustrating operation performed among the user device 200, the service devices 300A, 300B, and the directory agent 100 in the system as shown in FIG. 1. FIG. 12 shows a series of sequence until the user device 200 receives services from the service devices 300A, 300B in the present embodiment. In FIG. 12, a thick portion of a vertical line indicates power ON state (G0) of a corresponding device. The other portion indicates power OFF state (G2).

In the initial state of the operation of the system as shown in FIG. 1, the wireless LAN access point 400 is in power ON state (G0), and the other devices are in power OFF state (G2).

When the service device 300A is connected to the network, and a user performs a predetermined operation, e.g., turns on a the service device 300A, the service device 300A transmits an activation signal to the directory agent 100 using the MAC address of the directory agent 100 set in the service device 300A in advance (S401), and accordingly, the directory agent 100 is turned on by WOL.

The service device 300A transmits device information to the directory agent 100 (S402). The directory agent 100 stores the device information. Thereafter, the directory agent 100 turns off the power of itself.

Likewise, when the service device 300B is connected to the network and is turned on, the service device 300B transmits a magic packet (activation signal) to the directory agent 100 using the MAC address of the directory agent 100 set in the service device 300B in advance (S403), and accordingly, the directory agent 100 is turned on by WOL.

The service device 300B transmits device information to the directory agent 100 (S404). The directory agent 100 stores the device information. Thereafter, the directory agent 100 turns off the power of itself.

The directory agent 100 is turned on by itself using a timer, and the directory agent 100 extracts the MAC address of the registered service device among the stored device information, and transmits an activation signal to each service device (S405). Thereby, the service device is turned on.

The directory agent 100 confirms life of all the service devices (S406). More specifically, the directory agent 100 transmits life confirmation requests to the service devices 300A, 300B, and each service device transmits a life notification to the directory agent 100. Thus, the lives are confirmed.

Here, the life confirmation request may be extracted from the device information stored in the directory agent 100. Alternatively, the life confirmation request may be transmitted to a multicast address defined in advance, or may be transmitted by broadcast.

Alternatively, without any life confirmation request from the directory agent 100, the service devices 300A, 300B may transmit a spontaneous message for life confirmation (life notification) to the directory agent 100 (or to a multicast or broadcast address set in advance). It is preferable for the service devices 300A, 300B to be turned off automatically after a certain period of time passes since they are activated. Further, it is preferable for the directory agent 100 to be turned off automatically after a certain period of time passes since the directory agent 100 transmits the life confirmation request.

When the user turns on the user device 200, the user device 200 transmits an activation signal to the directory agent 100 (S407), so that the directory agent 100 is turned on.

Thereafter, the user device 200 obtains all the device information stored in the directory agent 100 (S408). More specifically, the device information is obtained as follows. The user device 200 transmits a device information retrieval request to the directory agent 100, and in response, the directory agent 100 transmits the device information to the user device 200. It is preferable for the directory agent 100 to be turned off automatically after a certain period of time passes since the directory agent 100 transmits the device information.

The user device 200 having received the device information presents a list of available services to the user on the basis of the device information. When the user selects a service, the user device 200 extracts the MAC address from the device information of the service device corresponding to the service selected by the user, and transmits a magic packet (activation signal) to the corresponding service device (S409). Thereafter the service device is turned on.

When the service provided by the service device has a function of discovering services in the service application level such as UPnP, NETBIOS, ECHONET, the user device 200 discovers the service according to the specification (S410). At this occasion, it is preferable for the user device 200 to confirm the operational state of the service device using the service discovery function.

Then, the user device 200 uses the service provided by the service device (S411). Examples of services include a printing service for a printer, a motion picture display service for transmitting motion picture data to a television set, a NAS file service, and an air conditioner operation for an air conditioner.

When a certain period of time passes since the user finishes using the service, the service device is automatically turned off. Further, the user turns off the user device 200.

In the system of the present embodiment, the directory agent 100 collectively manages the MAC addresses of the user device 200 and the service devices 300A, 300B as the device information. Therefore, only the MAC address of the directory agent 100 may be set in the user device 200 and the service devices 300A, 300B. Thus, the same setting of the MAC address may be made on each device. As a result, this eliminates the cumbersome process of setting the MAC addresses of all the service devices to the user device 200. Further, for example, the activation signal processing unit may be expanded so that, when the directory agent receives an activation signal transmitted via broadcast or multicast, the directory agent is activated even if the activation signal does not have the MAC address of the directory agent. Here, the user device and the service device do not have to set the MAC address of the directory agent. Further, the directory agent 100 is in power OFF state except when the directory agent 100 is operating, e.g., when the directory agent 100 receives the device information from the service device 300 or provides the device information to the user device 200. Therefore, the directory agent 100 can reduce the power consumption.

It should be noted that the directory agent 100 can be achieved by using, for example, a general-purpose computer device as basic hardware. In other words, the power management unit 101, the time management unit 102, the activation signal processing unit 103, the device information transmission unit 104, the device information storing unit 105, the life confirmation processing unit 106, the activation signal generation unit 107, and the data transmission/reception unit 108 can be achieved by causing a processor mounted on the computer device to execute a program. At this occasion, the directory agent 100 may be realized by installing the program in the computer device in advance or may be realized by storing the program in a storage medium such as a CD-ROM or distributing the program via a network and installing the program in the computer apparatus as appropriate. The device information storing unit 105 can be realized by using a storage medium or the like such as a memory incorporated in or externally attached to the computer device, a hard disk, or a CD-R, a CD-RW, a DVD-RAM, or a DVD-R as appropriate.

In the explanation about the system of the present embodiment, for example, the user device 200 and the service devices 300A, 300B, 300C, 300D are connected via an IEEE802.11 wireless LAN, and communicate with each other using the IP protocol. However, the communication method is not limited to IEEE802.11. It may be other wireless methods such as Zigbee, Bluetooth, and WiMAX, and may be wired communication methods such as Ethernet network (registered trademark), IEEE1394, and USB. Alternatively, a plurality of communication methods may exist in a mixed manner. The service devices and the user device may be not only the printer, the television set, the NAS, and the air conditioner but also, for example, a cellular phone, a PDA, an electronic photoframe, and the like. The system according to the present embodiment is assumed to be in the home network. Alternatively, it may be in a public place such as an office network and a hot spot or may be provided outdoors.

The order of operation of the directory agent 100, the user device 200, the service device 300 and the system as shown in FIG. 6, FIG. 9, FIG. 11 and FIG. 12 respectively are not limited to those orders described therein.

In the above explanation, for example, the operational states include G0 (operating state), G1 (sleeping (so-called sleep or hibernation) state, in which the operational state can be shifted to the "operating state" in a shorter time than from the state of G2), G2 (soft off (so-called power OFF state in which the power consumption is less than that of G1 but it takes a longer time for the operational state to shift to the "operating state" than from G1)), and G3 (mechanically, completely turned off), and the operation state is shifted between G0 and G2. However, the operational state is not limited to the above. The operational state may be any state as long as each apparatus can receive an activation signal in a standby state for an activation signal, and once it is received, the operational state can be shifted to a state of higher power consumption.

Second Embodiment

Figure 13:
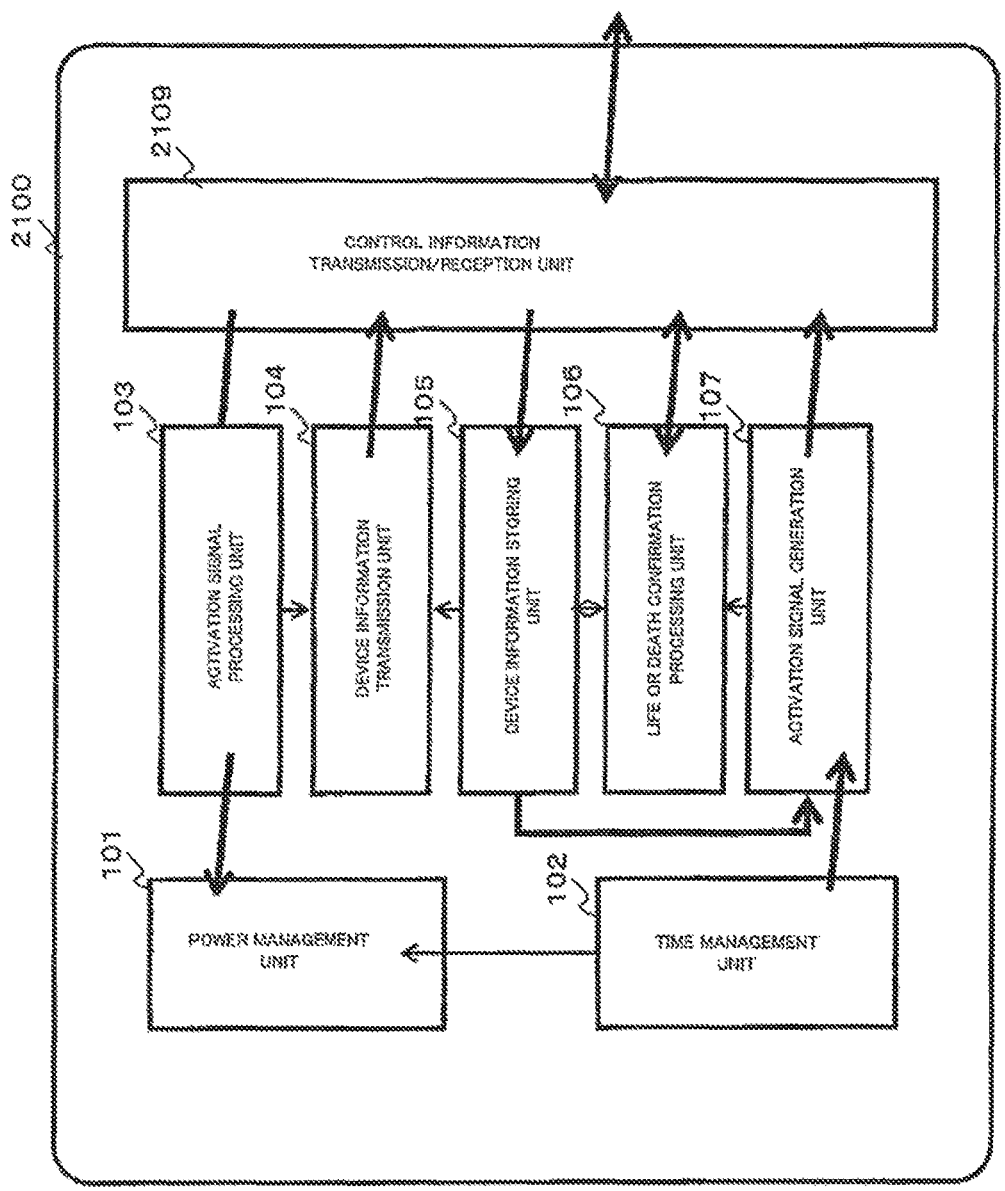
FIG. 13 is a block diagram illustrating an example of configuration of a directory agent according to a second embodiment of the present invention.
Figure 14:
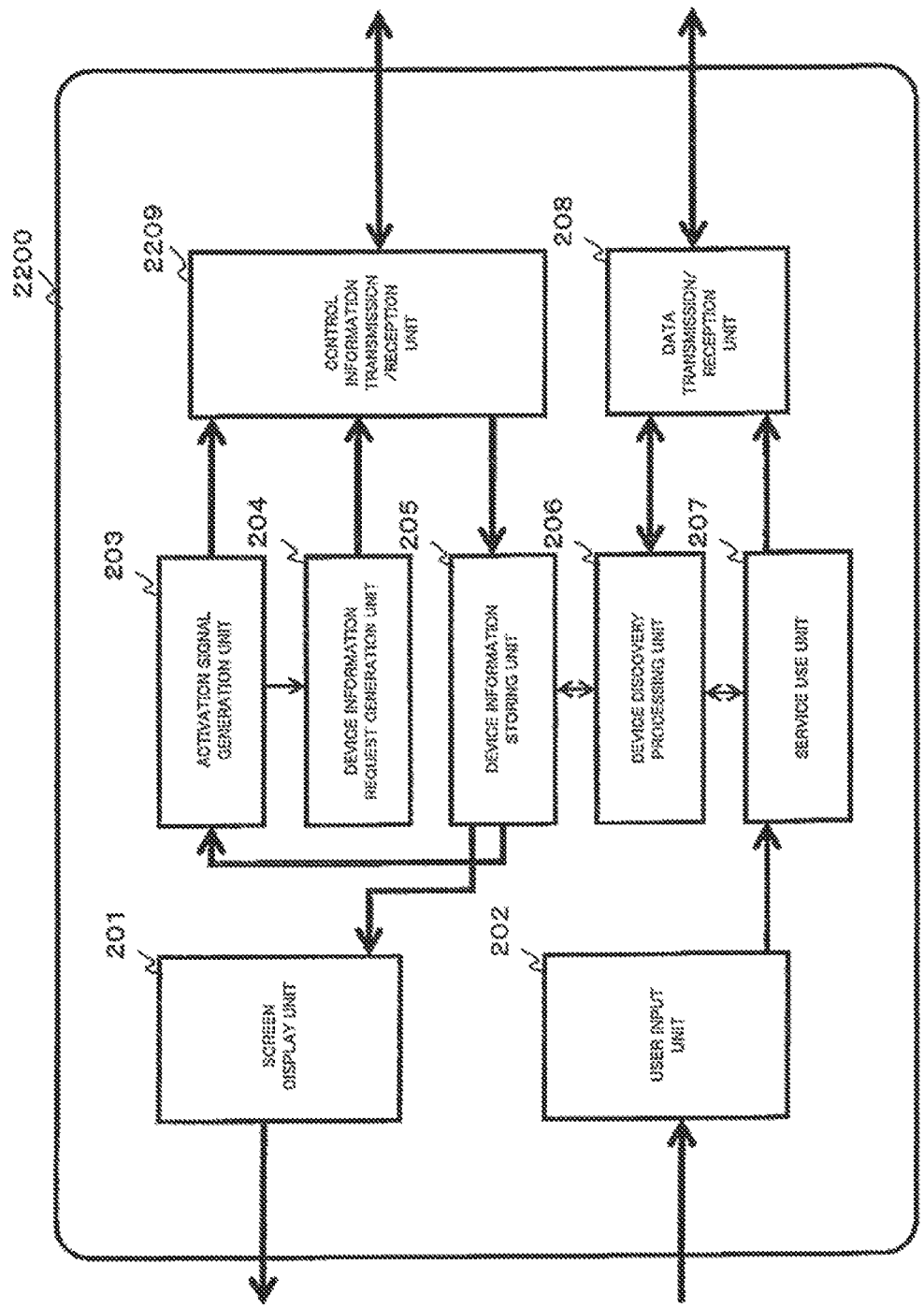
FIG. 14 is a block diagram illustrating an example of configuration of a user device according to the second embodiment of the present invention.
Figure 15:
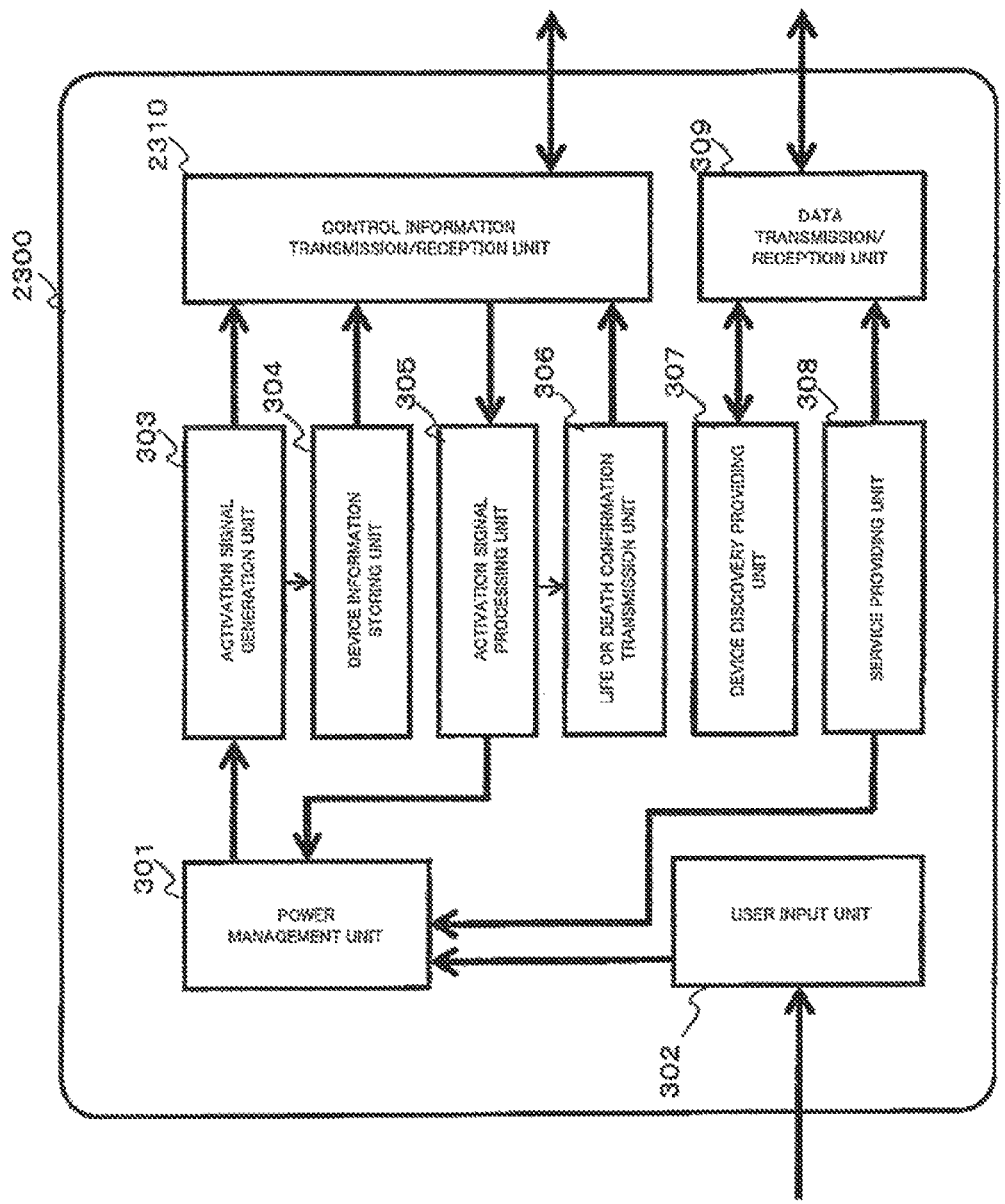
FIG. 15 is a block diagram illustrating an example of configuration of a service device according to the second embodiment of the present invention.

Now, the system according to the second embodiment of the present invention will be explained. FIG. 13 illustrates a configuration of a directory agent 2100 in the system according to the second embodiment. FIG. 14 illustrates a configuration of a user device 2200 in the system according to the second embodiment. FIG. 15 is a configuration of a service device 2300 according to the second embodiment.

The system according to the second embodiment of the present invention is different from the system according to the first embodiment in that control information transmission/reception units consuming less power than the data transmission/reception units communicate each other among the service devices 2300, the user device 2200, and the directory agent 2100. In other words, the control information transmission/reception units communicate an activation signal, device information, and a life confirmation among the service devices 2300, the user device 2200, and the directory agent 2100. The amount of data of the activation signal, the device information, and the life confirmation is less than that in the communication when a service device provides service to the user device. Therefore, communication is performed using a control information reception unit provided for communication of the activation signal, the device information, and the life confirmation, which is separately arranged in addition to the data transmission/reception unit that is used for providing service. In this configuration, the power consumption in idle state can be reduced. Here, the control information transmission/reception unit uses a lower speed communication method than the data transmission/reception unit. In general, the low speed communication method requires a simpler communication modulation method. Therefore, the size of the circuit therefor can be reduced, which enables reducing the power consumption during communication and reception standby.

More specifically, for example, the control information transmission/reception unit can use a communication method used in RFID (for example, a wireless communication method of ASK modulation), a communication method using infrared light such as IrDA method or that used in a remote controller for a television set 300B, and a wireless communication method consuming less power such as IEEE802.15.4. On the other hand, examples of communication methods used by the data transmission/reception unit include wireless LAN such as Ethernet network (registered trademark) and IEEE802.11, and also include USB and cellular wireless communication method.

Here, in addition to the main CPU, it is desirable to prepare a small processor (not shown) for communication processing using a control information transmission unit, so that when communication is performed using the control information transmission/reception unit, processing can be performed while most of the components in the device such as the main CPU and the main memory are kept turned off. The memory storing the device information is desirably nonvolatile, and it is desirable to store the contents therein without any power supplied thereto.

The directory agent 2100 uses a control information transmission/reception unit 2109 instead of the data transmission/reception unit 108 as shown in FIG. 13, compared with the directory agent 100 according to the first embodiment. The configuration thereof other than the above is the same as that of the directory agent 100, and description thereabout is omitted.

The control information transmission/reception unit 2109 has the same function as the data transmission/reception unit 108 except that the control information transmission/reception unit 2109 uses a low speed communication method.

FIG. 14 is a block diagram illustrating an example of configuration of the user device 2200 according to the second embodiment of the present invention. Compared with the user device 200 according to the first embodiment, the user device 2200 further includes a control information transmission/reception unit 2209. In other words, the user device 2200 has two interfaces, i.e., a data transmission/reception unit 208 and the control information transmission/reception unit 2209. That is, the user device 2200 is different from the user device 200 in that the user device 2200 may communicate via the data transmission/reception unit 208 and also communicate via the control information transmission/reception unit 2209.

The activation signal generation unit 203 transmits an activation signal via the control information transmission/reception unit 2209. A device information request generation unit 204 transmits a device information request via the control information transmission/reception unit 2209. A device information storing unit 205 receives a device information response via the control information transmission/reception unit 2209.

On the other hand, a service use unit 207 and a device discovery processing unit 206 communicate with the service device 2300 via a data transmission/reception unit 208.

FIG. 15 is a block diagram illustrating an example of configuration of a service device 2300 in the system according to the second embodiment of the present invention. As compared with the service device 300 according to the first embodiment, the service device 2300 further includes a control information transmission/reception unit 2310. That is, the service device 2300 includes two interfaces, i.e., a data transmission/reception unit 309 and a control information transmission/reception unit 2310. That is, the service device 2300 is different from the service device 300 in that the service device 2300 may communicate via the data transmission/reception unit 309 and also communicate via the control information transmission/reception unit 2310.

An activation signal generation unit 303 transmits an activation signal via the control information transmission/reception unit 2310. A device information storing unit 304 transmits device information via the control information transmission/reception unit 2310. An activation signal processing unit 305 receives an activation signal via the control information transmission/reception unit 2310. Further, a life confirmation transmission unit 306 confirms life via the control information transmission/reception unit 2310.

On the other hand, a service providing unit 308 and a device discovery providing unit 307 communicate with the service devices via the data transmission/reception unit 309.

Here, the device information of the service device 2300 preferably includes the type of service, the type of service protocol, the operational state, nickname, the MAC address of the control information transmission/reception unit of the device, and the MAC address of the data transmission/reception unit of the device.

Figure 16:
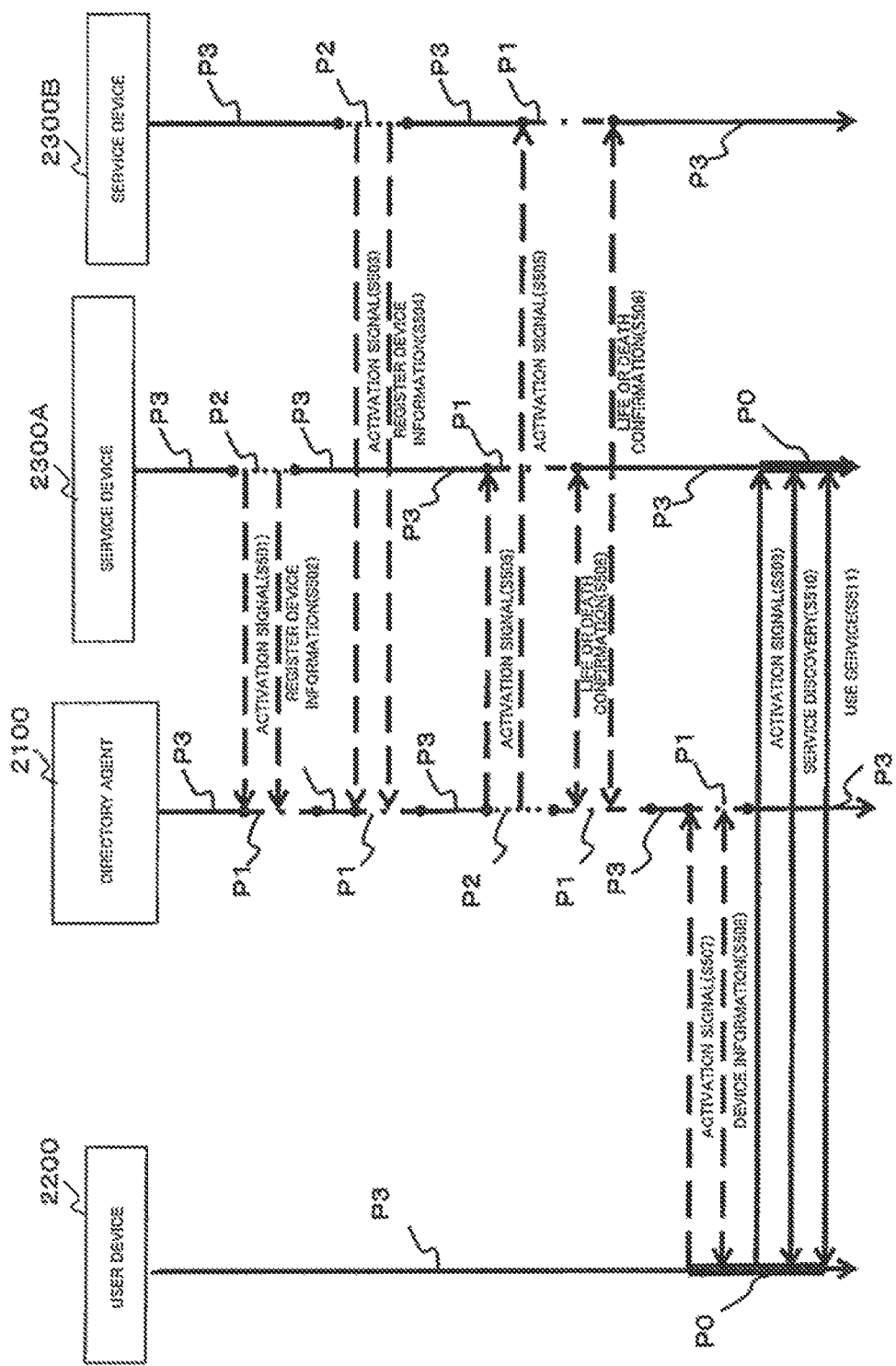
FIG. 16 is a sequence diagram illustrating operation performed among the user device, the service devices, and the directory agent in a system according to the second embodiment of the present invention.

FIG. 16 is a sequence diagram illustrating operation performed among the user device 2200, the service devices 2300A, 2300B, and the directory agent 2100. Here, the configurations of the service devices 2300A and 2300B are assumed to be the same as the configuration of the service device 2300. FIG. 12 shows a series of sequence until the user device 2200 communicates with the service devices 2300A, 2300B in the present embodiment.

In the present embodiment, the user device 2200, the service device 2300A, 2300B, and the directory agent 2100 shifts their operational states. In the present embodiment, there are four operational states, i.e., P0, P1, P2, P3. Here, P0, P1, and P2 are active states. P3 is an idle state. P0, P1, P2 are active states, but each state is different in power consumption. More specifically, the four operational states include P0 (a state in which any communication is possible), P1 (a state in which the power consumption is the lowest while any signal can be transmitted/received using the control information transmission/reception unit), P2 (a state in which the power consumption is the lowest while any signal can be transmitted using the control information transmission/reception unit), and P3 (a state in which the power consumption is the lowest while any activation signal can be received). In FIG. 16, the operational state of each device is represented by the type of vertical line. A solid line represents P3. A dotted line represents P2. An alternate long and short dashed line represents P1. A thick solid line represents P0. In FIG. 16, an arrow in dotted line represents communication performed via the control information communication transmission/reception unit, and an arrow in solid line represents communication performed via the data transmission/reception unit. In the explanation below, P0 is referred to as a first active state, P1 is referred to as a second active state, P2 is referred to as a third active state, and P3 is referred to as an idle state.

In the explanation below, as shown in FIG. 16, the initial states of the user device 2200, the service device 2300A, 2300B, and the directory agent 2100 are P3 (idle state). A wireless LAN access point 400 is in power-ON state.

When the service device 2300A is connected to the network, and a user performs a predetermined operation, e.g., turns on the service device 2300A, the service device 2300A shifts to the operational state P2 (third active state). Then, the service device 2300A transmits an activation signal to the directory agent 2100 using the MAC address of the control information transmission/reception unit 2109 of the directory agent 2100 (S501). Here, the MAC address of the control information transmission/reception unit 2109 of the directory agent 2100 is assumed to be set in the service device 2300A in advance. When the directory agent 2100 receives the activation signal from the service device 2300A, the operational state shifts to P1 (second active state).

Then, the service device 2300A uses the control information transmission/reception unit 2310 to transmit the device information to the directory agent 2100 (S502). The directory agent 2100 stores this device information. When the directory agent 2100 stores the device information, the operational state shifts to P3 (idle state). Here, the device information may be transmitted from the service device 2300A to the directory agent 2100 by using a broadcast address, or may be addressed to a multicast address set in advance.

Likewise, when the user turns on the service device 2300B, the service device 2300B shifts to the operational state P2 (third active state). The service device 2300B transmits an activation signal to the directory agent 2100 using the MAC address of the control information transmission/reception unit 2109 of the directory agent 2100 (S503). Here, the MAC address of the control information transmission/reception unit 2109 of the directory agent 2100 is assumed to be set in the service device 2300B in advance. When the directory agent 2110 receives the activation signal from the service device 2300B, the operational state shifts to P1 (second active state).

Then, the service device 2300B uses the control information transmission/reception unit 2310 to transmit the device information to the directory agent 2100 (S504). The directory agent 2100 stores this device information. When the directory agent 2100 stores the device information, the operational state shifts to P3 (idle state).

Then, the directory agent 2100 shifts the operational state of itself to P2 (third active state) using a timer. The directory agent 2100 extracts the MAC address of the control information transmission/reception unit 2310 of the registered service device from the device information stored therein, and transmits an activation signal to each service device (S505). When each service device receives an activation signal, the operational state is shifted to P1 (second active state).

Then, the directory agent 2100 shifts the operational state of itself to P1 (second active state), and confirms lives of all the service devices (S506). More specifically, the directory agent 2100 transmits life confirmation requests to the service devices 2300 via the control information transmission/reception unit 2109, and each service device 2300 transmits a response thereto (life notification) to the directory agent 2100 via the control information transmission/reception unit 2310. Thus, the life is confirmed. After the service device 2300 transmits the life notification to the directory agent 2100, the service device 2300 shifts the operational state of itself to P3 (idle state).

Here, the life confirmation request may be extracted from the device information stored in the directory agent 2100. Alternatively, the life confirmation request may be transmitted to a multicast address defined in advance, or may be transmitted by broadcast.

Alternatively, without any life confirmation request from the directory agent 2100, the service devices 2300 may transmit a spontaneous message for life confirmation to the directory agent 2100 (or to a multicast address set in advance or may broadcast it).

Further, it is preferable for the service device 2300 to automatically shift the operational state to P3 (idle state) when a certain period of time passes since the service device 2300 received the activation signal and shifted the operational state to P1 (second active state).

When the user shifts the operational state of the user device 2200 to P0 (first active state), the user device 2200 transmits an activation signal to the directory agent via the control communication information transmission/reception unit 2209 (S507). When the directory agent receives the activation signal, the directory agent shifts the operational state to P1 (second active state).

Thereafter, the user device 2200 obtains all the device information stored in the directory agent 2100 (S508). More specifically, the control information transmission/reception unit 2209 of the user device 2200 transmits a device information request to the directory agent 2100, and when the directory agent 2100 receives the device information request, it transmits a device information response carrying the device information to the user device 2200.

For example, the directory agent 2100 shifts the operational state of itself to P3 (idle state) after a certain period of time passes since the directory agent 2100 transmits the device information to the user device 2200.

When the user device 2200 receives the device information, it presents a list of available services to the user on the basis of the device information. When the user device 2200 selects a service from among the presented services, it transmits an activation signal to the service device 2300 corresponding to the selected service. Here, the user device 2200 extracts the MAC address of the control information transmission/reception unit 2310 of the service device 2300 from among the device information of the selected service device 2300, and generates an activation signal using the MAC address, and transmits the activation signal to the corresponding service device 2300 (S509). When the service device 2300 receives the activation signal, it shifts the operational state to P0 (first active state).

When the service provided by the service device 2300 has a function of discovering services in the service application level such as UPnP and NETBIOS, the user device 2200 uses the data transmission/reception unit 208, and discovers the service according to the specification (S510).

Then, the user device 2200 uses the data transmission/reception unit 208 to use the service provided by the service device (S511).

The service device 2300 automatically shifts the operational state to P3 (idle state) when a certain period of time passes since the use of the service is finished. In addition, the user shifts the operational state of the user device 2200 to P3 (idle state).

According to the directory agent 2100 of the present embodiment, the control information transmission/reception unit consuming less power is provided as an interface for communicating between the user device 2200 and the service device 2300. As a result, this leads to reduction in the power consumption. More specifically, the directory agent 2100 is provided with a control information transmission/reception unit consuming less power instead of the data transmission/reception unit. Therefore, the power consumption can be reduced. In idle state, the user device 2200 and the service device 2300 can stop operation of the data transmission/reception unit consuming much power, thus capable of reducing the power consumption.

Like the first embodiment, according to the directory agent 2100 of the present embodiment, the operational state is shifted to different states between a period in which the discovery agent 2100 is not communicating and a period in which the discovery agent 2100 is communicating. As a result, this leads to reduction in the power consumption of the directory agent 2100.

In the explanation about the present embodiment, for example, the operational states include P0 (a state in which any communication is possible), P1 (a state in which the power consumption is the lowest while any signal can be transmitted/received using the control information transmission/reception unit), P2 (a state in which the power consumption is the lowest while any signal can be transmitted using the control information transmission/reception unit), and P3 (a state in which the power consumption is the lowest while any activation signal can be received). However, the operational states are not limited thereto. That is, the operational state may be any state as long as an activation signal can be received in the P3 (idle state) state and when the activation signal is received, the P3 state can be shifted to a state consuming more power. Further, the operational state is not necessarily shifted among the four states.

<Modification 1>

Now, a system according to a modification of the second embodiment of the present invention will be explained.

In the present embodiment, the communication method of the control information transmission/reception unit is RFID. In this case, even when one of communicating devices is ON and the other of the communicating devices is OFF, they can communicate with each other. The configurations thereof other than the above are the same as the configurations of the directory agent 2100, the user device, and 2300, which are explained in the second embodiment. Accordingly, description thereabout is omitted. In the explanation about the system according to the second embodiment, it is assumed that a signal relating to the device information and the life confirmation cannot be communicated in the operational state P3 (idle state). However, the device information and the life confirmation can be communicated even in the operational state P3 (idle state), when a technique such as RFID (Radio Frequency Identification) is used. In this technique, data transmission/reception, memory access, and processor operation can be realized using wireless electric power provided by a reader/writer even if there is no power source at the receiver side.

Figure 17:
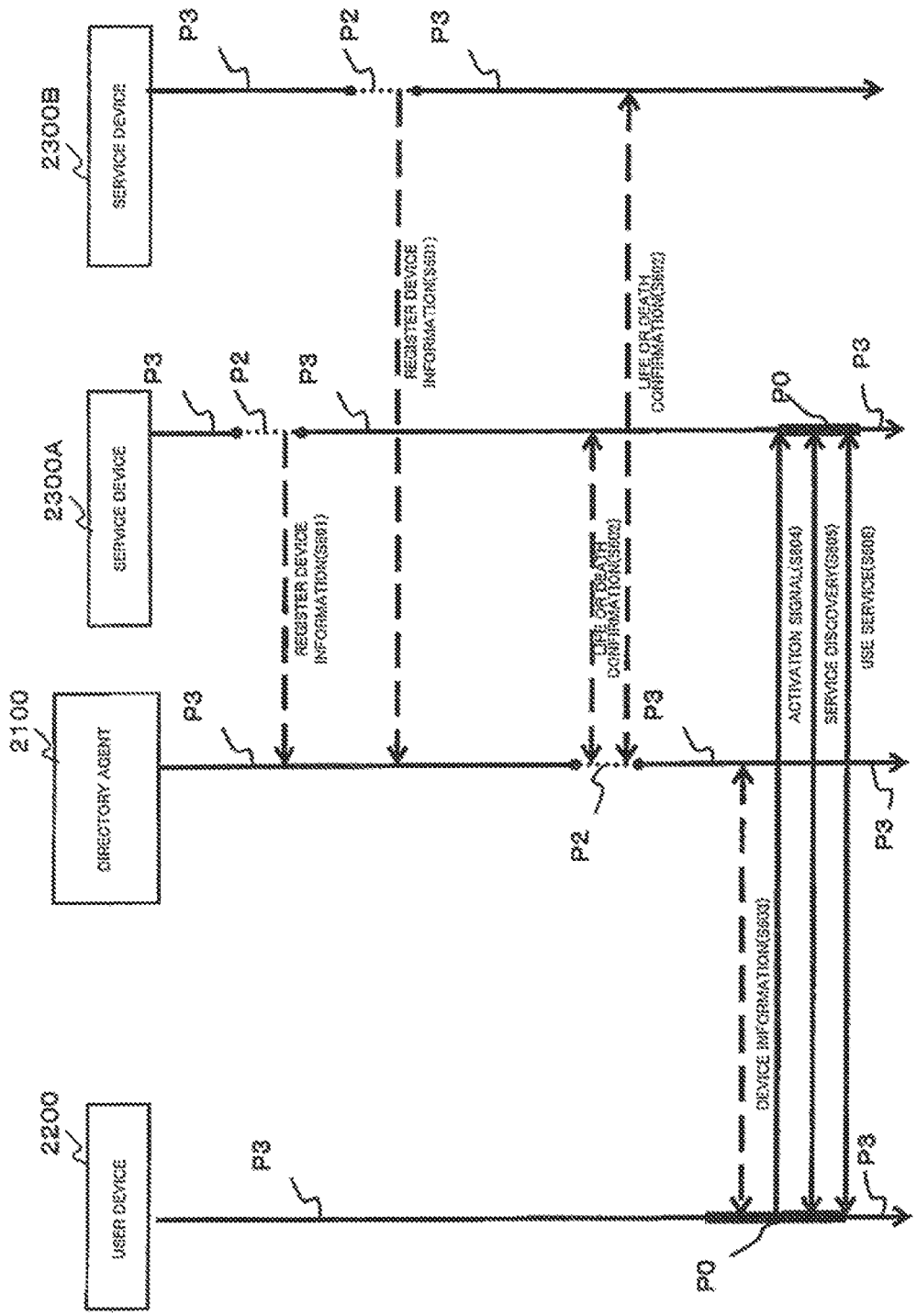
FIG. 17 is a sequence diagram illustrating operation performed among the user device, the service devices, and the directory agent in a system according to a first modification of the second embodiment.

FIG. 17 is a sequence diagram illustrating an example of operation performed among a user device 2200, service devices, and a directory agent 2100 in a system according to the first modification of the second embodiment. This sequence diagram is different from the sequence diagram of FIG. 16 in that this sequence diagram does not have the operational state P1 (a state in which the power consumption is the lowest while any signal can be transmitted/received using the control information transmission/reception unit). As described above, this is because the signal relating to the device information and the life confirmation can be received even in the operational state P3 (idle state). Due to the same reason, the activation signal is not transmitted/received in order to shift each apparatus from the operational state P3 (idle state) to the operational state P1 (second active state).

First, when the service device 2300A is connected to the network, and a user performs a predetermined operation, e.g., turns on the service device 2300A, the service device 2300A shifts to the operational state P2 (third active state). Then, the service device 2300A transmits device information to the directory agent 2100 using the MAC address of a control information transmission/reception unit 2109 of the directory agent 2100 (S601). Here, the MAC address of the control information transmission/reception unit 2109 of the directory agent 2100 is assumed to be set in the service device 2300A in advance. When the directory agent 2110 receives the device information from the service device 2300A, it stores the device information. Here, the directory agent 2100 performs device information reception processing and device information storage processing by using wireless electric power provided by the service device 2300A.

Likewise, when a service device 2300B is connected to the network, and a user performs a predetermined operation, e.g., turns on the service device 2300B, the service device 2300B shifts to the operational state P2. Then, the service device 23003 transmits device information to the directory agent 2100 using the MAC address of the control information transmission/reception unit 2109 of the directory agent 2100 (S601). Here, the MAC address of the control information transmission/reception unit 2109 of the directory agent 2100 is assumed to be set in the service device 2300B in advance. Receiving the device information from the service device 2300B, the directory agent 2110 stores the device information. Here, the directory agent 2100 performs device information reception processing and device information storage processing by using wireless electric power provided by the service device 2300B.

Then, the directory agent 2100 shifts the operational state of itself to P2 using a timer. The directory agent 2100 extracts the MAC address of the control communication information transmission/reception unit 2310 of the registered service device 2300 from the stored device information, and confirms life of all the service devices (S602). More specifically, the directory agent 2100 transmits life confirmation requests to the service devices 2300 via the control communication information transmission/reception unit 2109, and each service device 2300 transmits a response thereto (life notification) to the directory agent 2100 via the control communication information transmission/reception unit 2310. Thus, the life of each service device 2300 is confirmed. Here, it is desirable for the service device 2300 to transmit the life notification while the operational state is still P3 (idle state) without using the power provided by the service device 2300. For example, the directory agent 2100 may confirm the life confirmation of the service device 2300 in the same manner as an RFID reader reads ID information. Alternatively, the user device 2200 may once store the wireless electric power provided by the directory agent 2100 to a capacitor, and may transmit the life notification using this electric power.

When the user shifts the operational state of the user device 2200 to P0 (first active state), it uses a control information transmission/reception unit 2009 to obtain all the device information stored in the directory agent 2100 (S603). More specifically, the control information transmission/reception unit 2209 of the user device 2200 transmits a device information request to the directory agent 2100, and when the directory agent 2100 receives the device information request, it transmits a device information response carrying the device information to the user device 2200. Here, due to the same reason as that explained above, the directory agent 2100 can receive a device information request and can transmit a device information response even in the operational state P3 (idle state).

When the user device 2200 receives the device information, it presents a list of available services to the user on the basis of the device information.

When the user device 2200 selects a service among the presented services, the user device 2200 transmits an activation signal to the service device 2300 corresponding to the selected service. Here, the user device 2200 extracts the MAC address of the control information transmission/reception unit 2310 of the service device 2300 among the device information of the selected service device 2300, and generates an activation signal using the MAC address, and transmits the activation signal to the corresponding service device 2300 (S604). When the service device 2300 receives the activation signal, it shifts the operational state to P0 (first active state).

When the service provided by the service device 2300 has a function of discovering services in the service application level such as UPnP, NETBIOS, and ECHONET, the user device 2200 uses the data transmission/reception unit 208, and discovers the service according to the specification (S605).

Then, the user device 2200 uses the data transmission/reception unit 208 to use the service provided by the service device 2300 (S606).

The service device 2300 automatically shifts the operational state to P3 (idle state) when a certain period of time passes since the use of the service is completed. In addition, the user shifts the operational state of the user device 2200 to P3 (idle state).

According to the directory agent 2100 of the present modification, RFID is used, so that the operational state can be maintained in a state consuming less power when device information is transmitted and received. Therefore, the power consumption of the directory agent 2100 can be reduced.

According to the present modification, the directory agent 2100 may not have the activation signal processing unit 103 and the activation signal generation unit 107.

<Modification 2>

In the next, a system according to the second modification of the second embodiment of the present invention will be explained. In the system according to the present modification, a directory agent 3100 has a function of a wireless LAN access point, and a user device 2200 and service devices 2300 communicate data with each other via the directory agent 3100.

Figure 18:
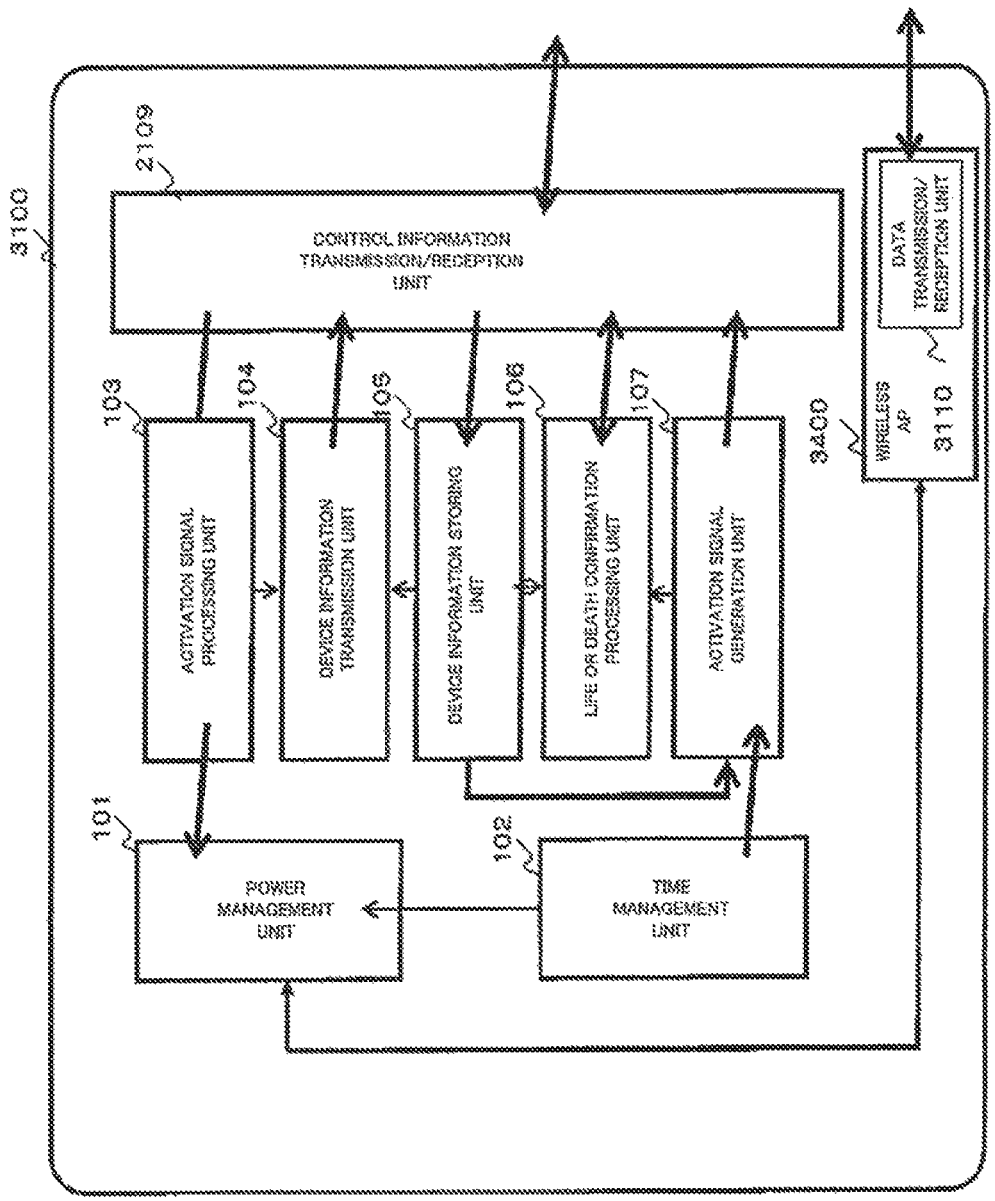
FIG. 18 is a block diagram illustrating a configuration of a directory agent according to a second modification of the second embodiment of the present invention.

FIG. 18 illustrates a configuration of a directory agent 3100 according to the second modification. As compared with the directory agent of the second embodiment, the directory agent 3100 further includes a wireless access point 3400.

The wireless access point 3400 has functions of an ordinary access point. In other words, the user device 2200 communicates with the service device 2300 via the wireless access point 3400 when it communicates with the service device 2300. The operational state of the wireless access point 3400 is controlled by a power management unit 101. In operational state P0 (first active state), the wireless access point 3400 always operates. In operational state P1 (second active state) and operational state P2 (third active state), the wireless access point 3400 may operate or may not operate. Further, in operational state P3 (idle state), the wireless access point 3400 is assumed not to operate. FIG. 18 shows a data transmission/reception unit 3110 as a portion of configuration of the wireless access point 3400. The data transmission/reception unit 3110 communicates with a data transmission/reception unit 208 of the user device 2200 and a data transmission/reception unit 309 of the service device 2300. It should be noted that the wireless access point 3400 has not only the data transmission/reception unit 3110 but also elements for achieving the functions needed for operating as a wireless LAN access point. However, these are the same as those of an ordinary access point, and therefore, description thereabout is omitted.

Figure 19:
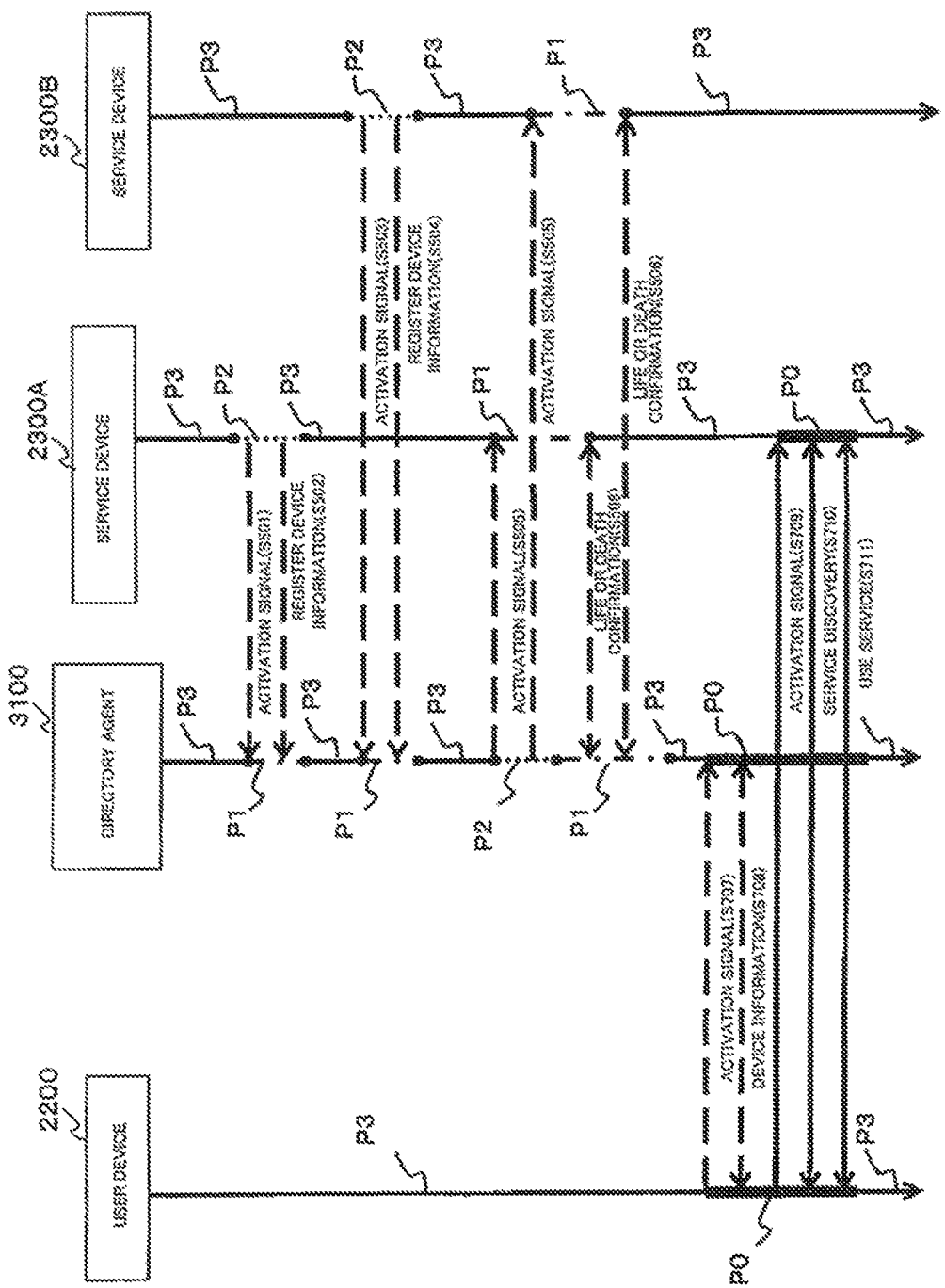
FIG. 19 is a sequence diagram illustrating operation performed among the user device, the service devices, and the directory agent in the system according to the second modification of the second embodiment.

FIG. 19 is a sequence diagram illustrating operation performed among the user device 2200, the service devices, and the directory agent 3100 in the system according to the second modification of the second embodiment.

Steps S501 to S506 are the same as the operation explained in FIG. 16.

Having received the activation signal from the user device 2200 in S707, the directory agent 3100 shifts to the operational state P0 (first active state).

Thereafter, the user device 2200 obtains all the device information stored in the directory agent 3100 (S708). More specifically, a control information transmission/reception unit 2209 of the user device 2200 transmits a device information request to the directory agent 2100, and the directory agent 3100 transmits a device information response carrying the device information to the user device 2200, when the directory agent 3100 receives the device information request.

After the directory agent 3100 transmits the device information to the user device 2200, the directory agent 3100 does not shift the operational state of itself to P3 (idle state), and maintains P0 (first active state).

When receives the device information, the user device 2200 presents a list of available services to the user on the basis of the device information. Selecting a service from among the presented services, the user device 2200 transmits an activation signal to the service device 2300 corresponding to the selected service. Here, the user device 2200 extracts the MAC address of a control information transmission/reception unit 2310 of the service device 2300 among the device information of the selected service device 2300. It generates an activation signal using the MAC address, and transmits the activation signal to the corresponding service device 2300 (S709). When receiving the activation signal, the service device 2300 shifts the operational state to P0 (first active state).

When the service provided by the service device 2300 has a function of discovering services in the service application level such as UPnP and NETBIOS, the user device 2200 discovers the service according to the specification (S7110) using the data transmission/reception unit 208.

Then, the user device 2200 uses the service provided by the service device (S711) via the data transmission/reception unit 208. Here, the user device 2200 performs the processings of S710 and S711 with the service device 2300 via the directory agent 3100.

The directory agent 3100 automatically shifts the operational state to P3 (idle state) when a certain period of time passes since the use of the service is finished. Here, the wireless LAN access point 3400 of the directory agent 3100 is also turned off. The service device 2300 automatically shifts the operational state to P3 (idle state). In addition, the user shifts the operational state of the user device 2200 to P3 (idle state).

As described above, the directory agent 3100 has the functions of the wireless LAN access point. Then, the directory agent 3100 can shift the operational state. The directory agent 3100 can shift the operational state of the wireless LAN access point 3400 to idle state. Therefore, this eliminates the necessity of keeping the wireless LAN access point turned on at all times, although it is necessary to keep the wireless LAN access point turned on in the past. As a result, the power consumption of the entire system can be reduced.

The user device 2200 and the service device 2300 according to the second embodiment and the directory agent 3100 according to the modification of the second embodiment may not transmit and receive the activation signal, the life confirmation, and the device information via the control information transmission/reception unit. Instead, they may transmit/receive them via the data transmission/reception unit.

In the explanation about the first and second embodiments, IPv4 protocol is used as an example. However, other protocols such as IPv6 protocol can also be used instead of IPv4.

Further, the user device and the service device may be the same device. For example, both of the user device and the service device may be PCs.

In FIG. 1, the directory agent is depicted as being located in proximity to the user device and the service device. However, it may be arranged at any physical location as long as it is connected in terms of network.

As shown in FIG. 1, it is not necessary for the directory agent to be in the same network as the service device and the user device. For example, device information of devices in a plurality of home networks may be managed by one directory agent.

In the above explanation, there is only one user device, for example. However, there may be a plurality of user devices.

Several embodiments of the present invention have been explained, but these embodiments are presented as examples, and are not intended to limit the scope of the invention. These new embodiments can be embodied in various other forms, and various kinds of omissions, replacements, and shifts can be made without deviating from the gist of the invention. These embodiments and the modifications thereof are included in the scope and the gist of the invention, and are included in the invention described in the claims and the scope equivalent thereto.

What is claimed is:

1. A communication device management apparatus comprising:
    a first communication unit configured to be able to connect to a network which is formed by a user device and a service device and configured to communicate with the user device and the service device by using a first communication method;
    a device information storing unit configured to store device information of the service device that is received from the service device via the first communication unit;
    an activation signal processing unit configured to receive an activation signal from the user device via the first communication unit;
    a device information transmission unit configured to transmit the device information stored in the device information storing unit to the user device via the first communication unit; and
    a power management unit configured to control an operational state of the communication device management apparatus,
    wherein each of the user device and the service device has a second communication unit and is able to connect to another network by the second communication unit,
    the service device provides service to the user device through the second communication unit by using a second communication method,
    power consumption of the first communication unit is lower than power consumption of the second communication unit,
    when the activation signal processing unit receives the activation signal, the power management unit shifts the operational state from an idle state to an active state that consumes more power than the idle state,
    the device information transmission unit transmits the device information after the operational state is shifted to the active state, and
    the power management unit shifts the operational state from the active state to the idle state after the device information is transmitted.

2. The communication device management apparatus according to claim 1, wherein the activation signal processing unit receives a second activation signal via the first communication unit from the service device,
    the power management unit shifts the operational state from the idle state to the active state when the activation signal processing unit receives the second activation signal,
    the device information storing unit stores the device information after the operational state is shifted to the active state, and
    the power management unit shifts the operational state from the active state to the idle state after the device information is stored.

3. The communication device management apparatus according to claim 1, wherein in the idle state, the first communication unit, the activation signal processing unit, and the power management unit are operating.

4. The communication device management apparatus according to claim 3, wherein the device information includes a MAC address of the service device,
    the user device generates a third activation signal generated on the basis of the MAC address when the user device receives the device information, and notifies the third activation signal to the service device, and
    the service device shifts the operational state from the idle state to the active state when the service device receives the third activation signal.

5. The communication device management apparatus according to claim 4, further comprising a life confirmation processing unit for receiving a life notification via the first communication unit from the service device identified by the device information stored in the device information storing unit.

6. The communication device management apparatus according to claim 5, wherein after the life notification is received, the power management unit shifts the operational state to the idle state.

7. The communication device management apparatus according to claim 6, wherein the life confirmation processing unit notifies a life confirmation request to the service device via the first communication unit, and receives the life notification as a response to the life confirmation request,
    the activation signal processing unit transmits a fourth activation signal to the service device before the life confirmation processing unit transmits the life confirmation request, and
    the operational state is shifted from the idle state to the active state when the service device receives the fourth activation signal.

8. The communication device management apparatus according to claim 7, further including a function of a wireless access point,
    wherein the user device and the service device transmit and receive data via the communication device management apparatus, and
    the function of the wireless access point is stopped when the communication device management apparatus is in the idle state.

9. The communication device management apparatus according to claim 8, wherein the power management unit shifts the operational state from the active state to the idle state after the device information is transmitted and the user device and the service device transmit and receive data via the communication device management apparatus.

10. A user device for using a service provided by a service device, the user device comprising:
    a first communication unit for communicating with a communication device management apparatus and the service device by using a first communication method, the first communication unit being able to connect to a network which is formed by the communication device management apparatus and the service device;
    a second communication unit for using the service provided by the service device by using a second communication method, the second communication unit being able to connect to another network;
    an activation signal processing unit for transmitting an activation signal via the first communication unit to the communication device management apparatus; and
    a device information request generation unit for transmitting a request signal for requesting the communication device management apparatus to transmit device information of the service device,
wherein power consumption of the first communication unit is lower than power consumption of the second communication unit, and
the activation signal processing unit transmits the activation signal to the communication device management apparatus before the device information request generation unit transmits the request signal to the communication device management apparatus, and wherein an operational state is shifted from an active state to an idle state after the device information is transmitted.

11. A service device for providing a service to a user device, the service device comprising:
a first communication unit configured to communicate with a communication device management apparatus and the user device by using a first communication method, the first communication unit being able to connect to a network which is formed by the communication device management apparatus and the user device;
a second communication unit configured to provide the service to the user device by using a first communication method, the second communication unit being able to be connected to another network;
an activation signal generation unit configured to transmit an activation signal via the first communication unit to the communication device management apparatus; and
a device information storing unit configured to store device information of the service device,
wherein power consumption of the first communication unit is lower than power consumption of the second communication unit, and
the activation signal generation unit transmits an activation signal to the communication device management apparatus before the first communication unit transmits the device information to the communication device management apparatus.

12. A communication device management apparatus, comprising:
a first communication unit for communicating with a user device and a service device by RFID, the first communication unit being able to connect to a network which is formed by the user device and the service device;
a device information storing unit configured to store device information of the service device that is received from the service device via the first communication unit; and
a device information transmission unit configured to transmit the device information stored in the device information storing unit to the user device via the first communication unit,
wherein each of the user device and the service device has a second communication unit and is able to connect to another network by the second communication unit,
the service device provides service to the user device through the second communication unit by using a communication method which is different from the RFID,
power consumption of the first communication unit is lower than power consumption of the second communication unit,
the device information storing unit stores the device information using wireless electric power received from the service device when the communication device management apparatus is in idle state, and
the device information transmission unit transmits the device information using wireless electric power received from the user device when the communication device management apparatus is in the idle state.

13. A communication device management program that causes a computer to function as a communication device management apparatus comprising steps of:
communicating with a user device and a service device through a communication unit;
storing device information of the service device that is received from the service device via the communication unit in a device information storing unit;
receiving an activation signal from the user device via the communication unit using an activation signal processing unit;
transmitting the device information stored in the device information storing unit to the user device via the communication unit; and
controlling an operational state of the communication device management apparatus through a power management unit such that
when the activation signal processing unit receives the activation signal, the power management unit shifts the operational state from an idle state to an active state the consumes more power than the idle state,
the device information transmission unit transmits the device information after the operational mode state is shifted to the active state, and
the power management unit shifts the operational state from the active state to the idle state after the device information is transmitted,
wherein each of the user device and the service device has a second communication unit and is able to connect to a network by the second communication unit,
the service device provides service to the user device through the second communication unit by using a second communication method, and
power consumption of the first communication unit is lower than power consumption of the second communication unit.

* * * * *